United States Patent [19]

Omura et al.

[11] Patent Number: 4,771,400
[45] Date of Patent: Sep. 13, 1988

[54] BIT DENSITY CONTROLLER

[75] Inventors: Jimmy K. Omura, Cupertino; Leslie Nightingill, Palo Alto; Michael J. Sabin, Sunnyvale, all of Calif.

[73] Assignee: Cylink Corporation, Sunnyvale, Calif.

[21] Appl. No.: 946,808

[22] Filed: Dec. 29, 1986

[51] Int. Cl.⁴ .............................................. G06F 1/00
[52] U.S. Cl. ................................................... 364/900
[58] Field of Search ... 364/200 MS File, 900 MS File; 375/17

[56] References Cited

U.S. PATENT DOCUMENTS

| | | | |
|---|---|---|---|
| 3,395,250 | 7/1968 | Lien | 179/15 |
| 3,437,927 | 4/1969 | Cornwell, Jr. et al. | 324/102 |
| 3,535,620 | 10/1970 | Johnston | 324/28 |
| 4,202,051 | 5/1980 | Davida et al. | 375/2 |
| 4,214,206 | 7/1980 | Everaarts | 375/4 |
| 4,463,344 | 7/1984 | Adler et al. | 340/347 DD |
| 4,488,142 | 12/1984 | Franaszek | 340/347 DD |
| 4,488,143 | 12/1984 | Martin | 340/347 DD |
| 4,509,194 | 4/1985 | Harrington | 382/56 |
| 4,562,427 | 12/1985 | Ecton | 340/825.5 |
| 4,583,236 | 4/1986 | Kromer et al. | 375/17 |

OTHER PUBLICATIONS

"Algorithms Sliding Block Codes, " Roy L. Adler, et al., *IEEE Transactions on Information Theory*, vol. IT-29, No. 1, Jan. 1983.
"551 V Clear Channel System, " Verilink Corporation, 1985.
"TieLink 56, " Kentrox Industries, Inc., 1986.
"Binary Dilemma: How Many 'Ones' Does T1 Need?" Data Communications, Jun. 1986, pp. 53, 54, and 56.
"Accunet T1.5 Service Description and Interface Specifications", AT&T Preliminary Technical Reference Manual, PUB 62411, Oct. 1985.
"T1 Standards and Regulations: Conflict and Ambiguity", *Telecommunications*, Mar. 1987.
Gregory Beveridge et al., "The ISDN Cornerstone", *Telephone Engineer & Management,* Feb. 15, 1986.

*Primary Examiner*—Raulfe B. Zache
*Attorney, Agent, or Firm*—David B. Newman, Jr.

[57] ABSTRACT

A bit density controller is capable of transmitting no more than 15 consecutive 0-bits to be sent serially in a data bit sequence, without a 1-bit, for operating on the AT&T T1 network. The bit density controller includes a state machine having a state index and a substitution device coupled to the state machine. The bit density controller additionally can include a buffer for storing at least one frame of the data bit sequence, a memory for storing overhead bits, and an overhead bit inserter for inserting overhead bits into the data bit sequence.

51 Claims, 12 Drawing Sheets

"1" BIT SUBSTITUTION

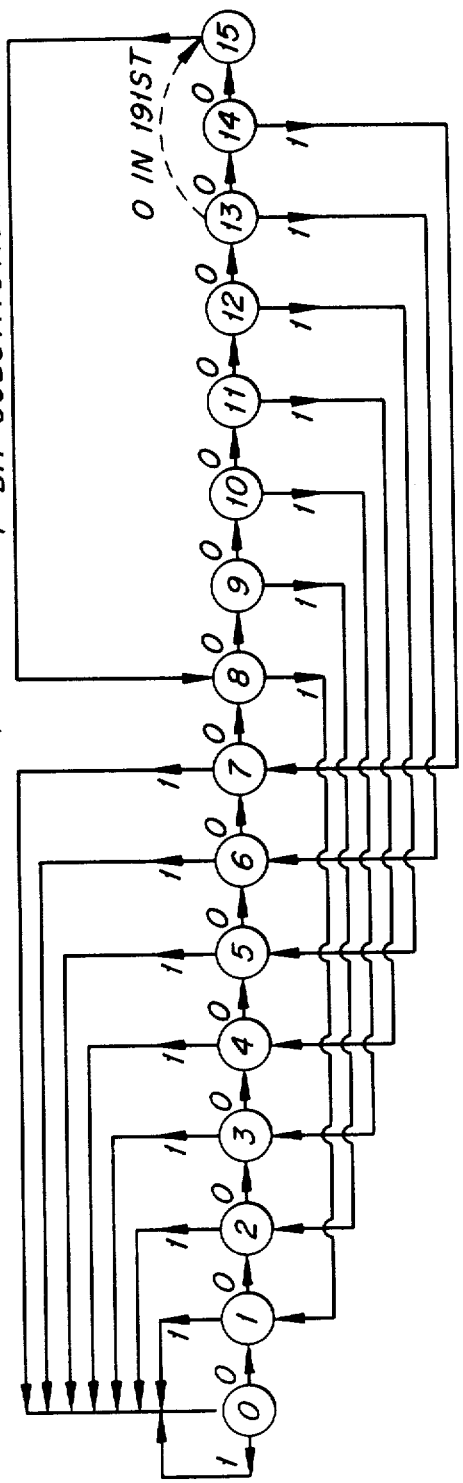

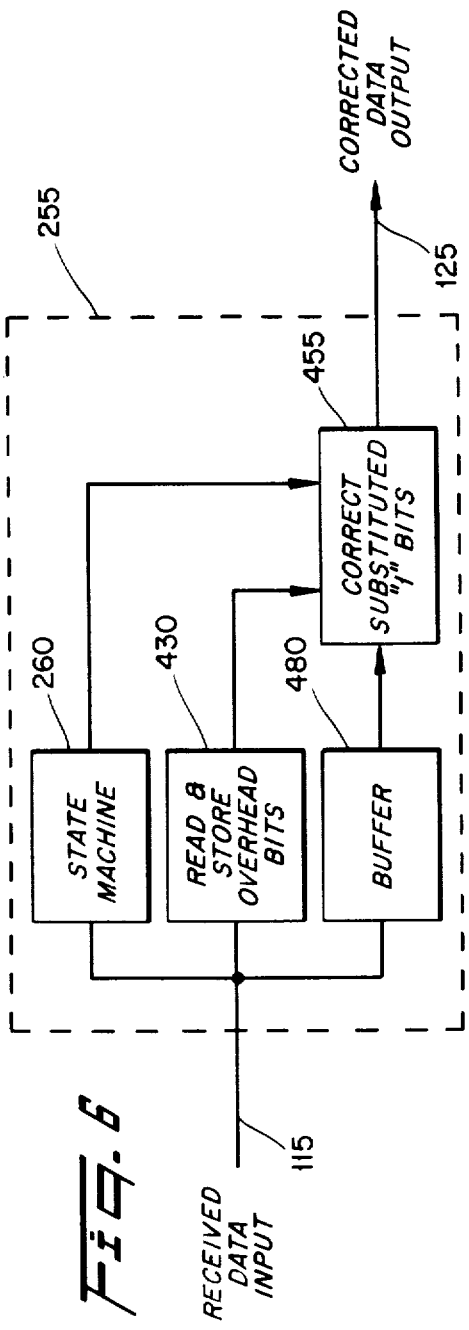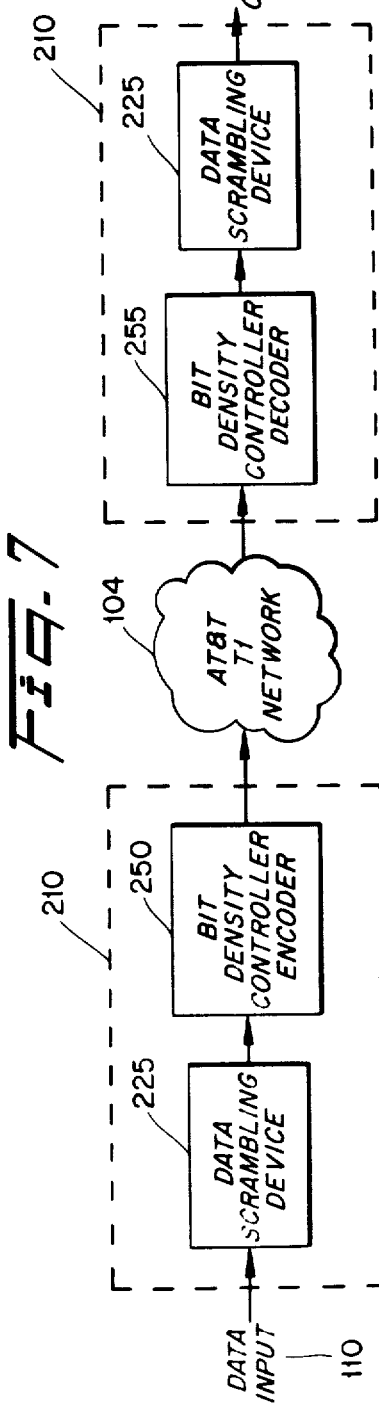

Fig.11

| $\underline{P}=$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1/2 | 1/2 | | | | | | | | | | | | | | |
| 1 | 1/2 | | 1/2 | | | | | | | | | | | | | |
| 2 | 1/2 | | | 1/2 | | | | | | | | | | | | |
| 3 | 1/2 | | | | 1/2 | | | | | | | | | | | |
| 4 | 1/2 | | | | | 1/2 | | | | | | | | | | |
| 5 | 1/2 | | | | | | 1/2 | | | | | | | | | |
| 6 | 1/2 | | | | | | | 1/2 | | | | | | | | |
| 7 | 1/2 | | | | | | | | 1/2 | | | | | | | |
| 8 | | 1/2 | | | | | | | | 1/2 | | | | | | |
| 9 | | | 1/2 | | | | | | | | 1/2 | | | | | |
| 10 | | | | 1/2 | | | | | | | | 1/2 | | | | |
| 11 | | | | | 1/2 | | | | | | | | 1/2 | | | |
| 12 | | | | | | 1/2 | | | | | | | | 1/2 | | |
| 13 | | | | | | | 1/2 | | | | | | | | 1/2 | |
| 14 | | | | | | | | 1/2 | | | | | | | | 1/2 |
| 15 | | | | | | | | | 1 | | | | | | | |

Fig.13

| $\hat{P}=$ | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 0 | 1/2 | 1/2 | | | | | | | | | | | | | | | |
| 1 | 1/2 | | 1/2 | | | | | | | | | | | | | | |
| 2 | 1/2 | | | 1/2 | | | | | | | | | | | | | |
| 3 | 1/2 | | | | 1/2 | | | | | | | | | | | | |
| 4 | 1/2 | | | | | 1/2 | | | | | | | | | | | |
| 5 | 1/2 | | | | | | 1/2 | | | | | | | | | | |
| 6 | 1/2 | | | | | | | 1/2 | | | | | | | | | |
| 7 | 1/2 | | | | | | | | 1/2 | | | | | | | | |
| 8 | | 1/2 | | | | | | | | 1/2 | | | | | | | |
| 9 | | | 1/2 | | | | | | | | 1/2 | | | | | | |
| 10 | | | | 1/2 | | | | | | | | 1/2 | | | | | |
| 11 | | | | | 1/2 | | | | | | | | 1/2 | | | | |
| 12 | | | | | | 1/2 | | | | | | | | 1/2 | | | |
| 13 | | | | | | | 1/2 | | | | | | | | 1/2 | | |
| 14 | | | | | | | | 1/2 | | | | | | | | 1/2 | |
| 15 | | | | | | | | | | | | | | | | | 1 |
| 16 | | | | | | | | | | | | | | | | | 1 |

Fig. 15

$$A = \begin{bmatrix} 1-P_1 & P_1 & 0 & 0 & 0 & 0 & 0 & 0 \\ 1-P_0-P_1 & P_0 & P_1 & 0 & 0 & 0 & 0 & 0 \\ 1-P_{-1}+P_0-P_1 & P_{-1} & P_0 & P_1 & 0 & 0 & 0 & 0 \\ 1-P_{-2}-P_{-1}-P_0-P_1 & P_{-2} & P_{-1} & P_0 & P_1 & 0 & 0 & 0 \\ P_{-4}+P_{-5}+P_{-6}+P_{-7} & P_{-3} & P_{-2} & P_{-1} & P_0 & P_1 & 0 & 0 \\ P_{-5}+P_{-6}+P_{-7} & P_{-4} & P_{-3} & P_{-2} & P_{-1} & P_0 & P_1 & 0 \\ P_{-6}+P_{-7} & P_{-5} & P_{-4} & P_{-3} & P_{-2} & P_{-1} & P_0 & P_1 \\ P_{-7} & P_{-6} & P_{-5} & P_{-4} & P_{-3} & P_{-2} & P_{-1} & P_0+P_1 \end{bmatrix}$$

BIT DENSITY CONTROLLER

BACKGROUND OF THE INVENTION

This invention relates to a bit density controller for continuously operating on a data bit, sequence, and more particularly to a bit density controller for meeting the AT&T T1 network bit density requirement.

DESCRIPTION OF THE PRIOR ART

The AT&T T1 network allows the transmission of data between users at 1.544 Mbps. Because of the equipment used in the T1 network, AT&T has specifications for its T1 service permitting no more than 15 consecutive 0-bits to be sent serially in a data bit sequence, without a 1-bit. Additionally, in each and every time window of $8 \times (n'+1)$ bits, where n' can equal 1 through 23, there must be at least n' 1-bits present. These specifications are called the ones-bit density requirement. This requirement is necessary for keeping equipment, such as repeaters, in the network from losing synchronization. A user of the AT&T T1 network typically meets this requirement by using a channel service unit inserted between the user's equipment and the T1 network.

As conceptually shown in FIG. 1, a channel service unit 102 is used with the AT&T T1 network 104. Generally, a customer or user of the system supplies data from a multiplexer or other user equipment to the data input 110, or alternatively receives data from the data output 120. Within this system a channel service unit 102 is coupled in between the multiplexer and the AT&T T1 network 104.

In the AT&T T1 network, repeaters derive their signal-sampling time from the user's incoming data bit sequence. When too many 0-bits are received by a repeater, timing jitter develops and the repeater may lose synchronization. The repeater may return to synchronization upon receipt of 1-bits, or it may shut down and revert to an alarm condition, continuously notifying the network that it has lost the signal.

Thus, to meet AT&T's ones-bit density requirement for a data bit sequence entering the T1 network, a channel service unit must add 1-bits, possibly indiscriminately, corrupting the data values of the users data bit sequence. A randomly inserted 1-bit will introduce errors unless the channel service unit is designed with a method to compensate for the inserted 1-bit. In the prior art, channel service units are available which take a data bit sequence and convert it into a second data bit sequence which meets this AT&T requirement using a deterministic approach This is done, for example, by looking at one byte, eight bits, at a time and determining whether the byte contains all 0-bits. If the byte contains all 0-bits, then a 1-bit is inserted therein. For digital voice where each byte is an eight bit sample, the least significant bit is where a 1-bit is typically inserted. This method of meeting the AT&T T1 network ones-bit density requirement causes errors. The problem with randomly adding or changing a bit is that the receiving unit does not have information that this bit was added or changed and thus produces an error. For digital voice this may slightly degrade the voice quality. It causes significant problems with computer data. The problem is further enhanced when entering the channel with encryption equipment which transmits encrypted data through the channel service unit which occasionally adds a 1-bit. The randomly added 1-bit can cause error extensions in the decrypted data.

Another technique presently used in the prior art, called Binary 8 Zero Suppression (B8ZS), calls for the insertion of two 1-bits, of alternating polarity, in each zero byte. The problem with this technique is that it introduces bipolar violations.

A different technique used in the prior art designed for meeting the ones-bit density requirement is called Zero Byte Time Slot Interchange (ZBTSI). This technique presumes either an AT&T Extended Superframe Format (ESF) and uses the inherent data link for carrying the addresses of byte locations where 1-bits have been inserted in bytes having all 0-bits or an AT&T D4 framed signal in which the signaling bits are used to indicate when 1-bits have been inserted in zero bytes. This technique, unfortunately, is said to have some unfavorable delay and error characteristics and it remains to be seen whether ZBTSI would work in conjunction with the AT&T ESF links and new switched services and equipment such as DACS.

The specifications for data transmission through the T1 network further include having 193 bit frames, with a frame synchronization bit included therein. The frame synchronization bits may be either a 1-bit or 0-bit and cannot be altered by the channel service unit or other user interface equipment.

Thus, a major problem with the present methods and apparatus available in the prior art for meeting the ones-bit density requirement for the AT&T T1 network is that they often change frame bits and require several frames of delays. Often they cause errors which are unacceptable in general and especially when using encrypted transmissions over the AT&T T1 network.

OBJECTS AND SUMMARY OF THE INVENTION

An object of the present invention is to provide a bit density controller which transmits not more than 15 0-bits in a row, and in each and every time window of $8 \times (n'+1)$ bits, where n' can equal 1 through 23, there should be at least n' 1-bits present.

Another object of the present invention is to provide a bit density controller which is self-synchronizing.

A further object of the present invention is to provide a bit density controller having virtually no error extension.

An additional object of the present invention is to provide a bit density controller which, in a first form, has a one bit delay; in a second form, has a one frame plus three bit delay; and, in a third form, can have a few bits of delay; is very robust, and is easy to implement.

According to the present invention, as embodied and broadly described herein, a bit density encoder controller for continuously operating on a data bit sequence and having a data input and a data output is provided comprising state means having a state index and states zero through $n-1$ (for n an even number), and coupled to the data input, and substitution means coupled to the state means and the data output. The state means and substitution means may be embodied as a state machine and substitution device, respectively. The present invention also can include buffer means coupled to the substitution means, memory means coupled to the state means, and inserting and outputting means coupled to the memory means, the buffer means, and the data output. The buffer means, memory means, and inserting and outputting means may be embodied as a buffer, an overhead bit memory, and an overhead bit inserter, respectively.

The state machine is coupled to the data input and senses the data bit sequence. The state index is incremented to a next higher state in response to sensing a 0-bit with the state index at any of the states zero through n−2, and returns the state index to the zero state in response to sensing a 1-bit with the state index at any of the states zero through (n/2)−1. The state machine decrements the state index by (n/2)−1 states in response to sensing a 1-bit with the state index at any of the states n/2 through n−1. For the state index at state n−1, the next state is always n/2 regardless of sensing a 0-bit or a 1-bit and the state machine generates an output signal specifying the bit sensed.

The substitution device is coupled to the data input and the data output, and the state machine. In response to receiving the output signal from the state machine, the substitution device forces the bit following the state index at state n−1 to a 1-bit.

The present invention can further include the buffer, the overhead bit memory, and the overhead bit inserter. The buffer is coupled to the substitution device for storing at least one frame of the data bit sequence. The overhead bit memory is coupled to the state machine and generates and stores overhead bits in response to the output signal. The overhead bit inserter is coupled to the buffer, the overhead bit memory and the data output. The overhead bit inserter generally inserts overhead bits into the frame of the data bit sequence stored in the buffer, and outputs the data bit sequence to the data output.

In a second embodiment of the present invention, an enhanced bit density controller encoder is provided for continuously operating on a data bit sequence and having a data input and a data output. The enhanced bit density controller includes the bit density controller and further includes a scrambling device coupled to the data input and responsive to the data bit sequence for generating a random data bit sequence.

In a third embodiment of the present invention, a bit density controller for continuously operating on a data bit sequence and having a data input and a data output is provided comprising state means having a state index and states zero through n−1 (for n an even number), and coupled to the data input, and controller means coupled to the data input, the state means and the data output. The state means and controller means may be embodied as a state machine and controller, respectively. The present invention also can include data buffer means coupled to the state means, and between the data input and the controller, and gap means coupled to the controller means. For an encoder, the data buffer means, and gap means may be embodied as a delay buffer, and a gap sequence generator, respectively. For a decoder, the data buffer means, and gap means may be embodied as an advance buffer, and a gap sequence generator, respectively.

The state machine is coupled to the data input and senses the data bit sequence. The state index is incremented to a next higher state in response to sensing a 0-bit with the state index at any of the states zero through n−2, and returns the state index to the zero state in response to sensing a 1-bit with the state index at any of the states zero through (n/2)−1. The state machine decrements the state index by (n/2)−1 states in response to sensing a 1-bit with the state index at any of the states n/2 through n−1. For the state index at state n−1, the next state is always n/2 regardless of sensing a 0-bit or a 1-bit and the state machine generates an output signal specifying the bit sensed.

For an encoder, the controller is responsive to the output signal and inserts a 1-bit into the data bit sequence and generates a delay bit sequence. The delay buffer is responsive to the delay bit sequence and delays the data bit sequence thereby allowing the controller to insert a 1-bit into the data bit sequence. The gap sequence generator generates a gap sequence which is used by the controller for reducing a delay in the data bit sequence caused by the controller inserting a 1-bit into the data bit sequence.

For a decoder, the controller is responsive to the output signal and removes a 1-bit from the data bit sequence and generates an advance bit sequence. The advance buffer is responsive to the delay bit sequence and advances the data bit sequence thereby allowing the controller to remove a 1-bit from the data bit sequence. The gap sequence generator generates a gap sequence which is used by the controller for reducing an advance in the data bit sequence caused by the controller removing a 1-bit from the data bit sequence.

Generally, an encoder and decoder will be used cooperatively as a pair. This system can be enhanced using a scrambling device coupled to the data input and responsive to the data bit sequence for generating a random data bit sequence.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate particular embodiments of the invention, and together with the description, serve to explain the principles of the invention.

FIG. 5 is a modified state diagram of the bit density controller's state machine for 16 states, for protecting frame bits according to the present invention;

FIG. 6 is a block diagrammatic view of an embodiment of a bit density controller decoder corresponding to the second embodiment of the bit density controller encoder of FIG. 4;

FIG. 7 is a block diagrammatic view of an embodiment of the present invention including data scrambling devices and bit density controllers coupled to the AT&T T1 network;

FIG. 11 is the transition probability matrix of the Markov chain formed by a random data bit sequence entering the state machine of FIG. 3;

FIG. 13 is the transition probability matrix of the Markov chain formed by a random data bit sequence entering the modified state machine of FIG. 12;

FIG. 15 is the delay transition matrix, A, for the Markov process described by the state diagram of FIG. 14.

DETAILED DESCRIPTION OF THE PREFERRED EMBODIMENTS

Reference will now be made in detail to the present preferred embodiments of the invention, examples of which are illustrated in the accompanying drawings.

Figure 1:
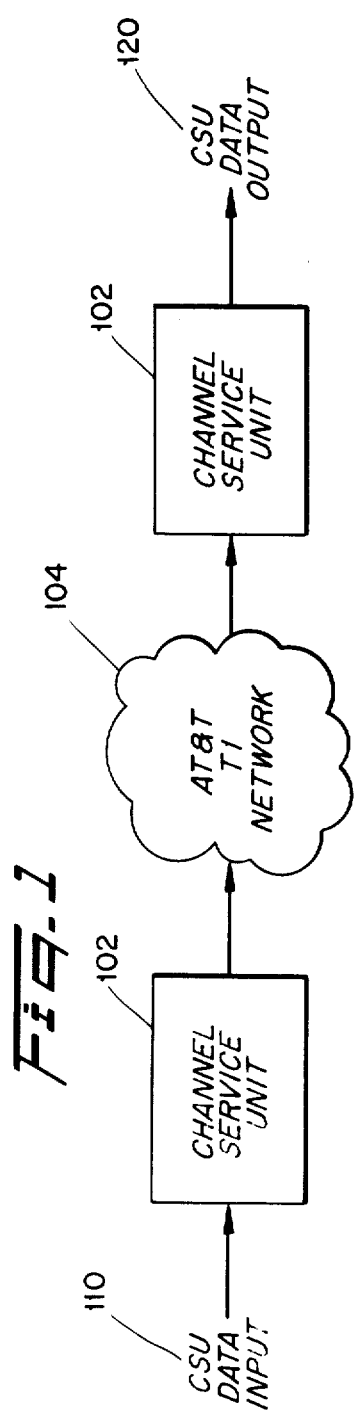
FIG. 1 is a block diagrammatic view of channel service units coupled to the AT&T T1 network.
Figure 2:
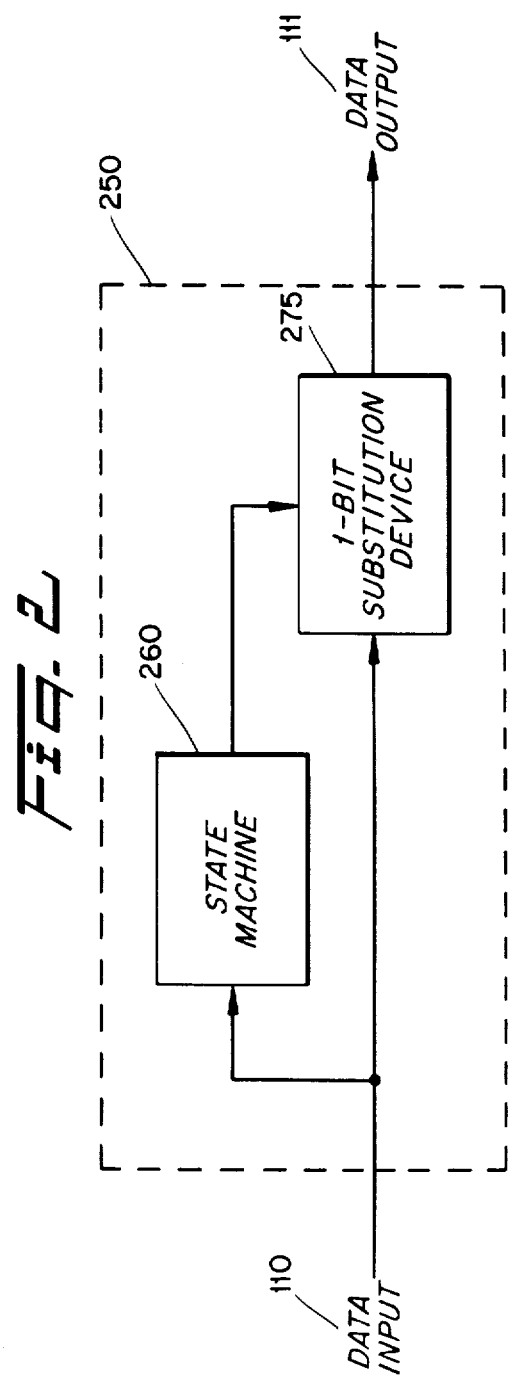
FIG. 2 is a block diagrammatic view of a first embodiment of a bit density controller encoder according to the present invention.

Referring to FIG. 2, a preferred first embodiment of a bit density controller encoder 250 for continuously operating on a data bit sequence and having a data input 110 and a data output 111 is provided comprising state means coupled to the data input 110, and substitution means coupled to the state means and the data output 111.

In the exemplary arrangement shown, the state means may be embodied as a state machine 260 having a state index and states zero through n−1, where n is an even number. The state machine 260 is coupled to the data input 110 and senses the data bit sequence. The state index is incremented to a next higher state in response to sensing a 0-bit with the state index at any of the states zero through n−2. The state index returns to a zero state in response to sensing a 1-bit with the state index at any of the states zero through (n/2)−1. The state machine 260 decrements the state index by (n/2)−1 states in response to the 0-bit with the state index at any of the states n/2 through n−1. Additionally, the state machine 260 generates an output signal in response to sensing any data bit with the n−1 state and decrements the state index to state n/2.

The substitution means may be embodied as a substitution device 275. The substitution device 275 is coupled to the data input 110 and the data output 120, and the state machine 260. In response to receiving the output signal from the state machine 260, the substitution device 275 forces the bit following the state n−1 to be a 1-bit. If this data bit is a 1-bit it remains unchanged whereas if it is a 0-bit it is changed to a 1-bit.

Figure 3:
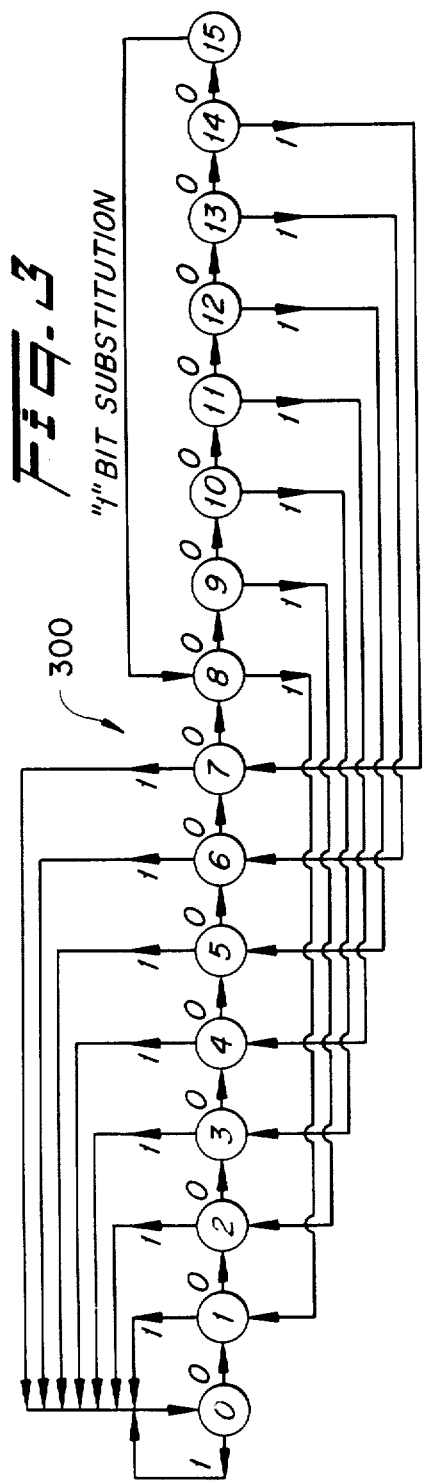
FIG. 3 is a state diagram of the bit density controller state machine for 16 states according to the present invention.

FIG. 3 illustratively shows a state diagram 300 of the state machine 260 for 16 states. The state diagram 300 includes the states depicted in the circles with numbers 0 through 15. In general, the state machine 260 senses the data bit sequence and increments the state index to a next higher state in response to sensing each 0-bit in the data bit sequence, for the state index at any state between zero and 14. Thus, the state index may start at the zero state and upon sensing a 0-bit will increment to the 1 state, and upon sensing a sequel 0-bit will increment to the 2 state. The state machine 260, will return the state machine to the zero state in response to sensing a 1-bit with the state index at any of the states zero through 7.

For the state diagram 300, if the state machine 260 senses more than seven 0-bits, then the state index may be set at any of the states 8 through 15, depending upon the number of 0-bits sensed. With the state index at any of the states 8 through 15, the state machine in response to sensing a 1-bit, will decrement the state index by seven. More broadly, this decrement is the number of states, n, divided by 2 minus 1; that is, (n/2)−1.

In the event that the state index reaches state 15 then the state index will automatically transition to state 8, whether a 0-bit or 1-bit is received. The state machine in response to reaching state 15 and detecting a 0-bit, will generate an output signal that it has passed to state 8 with a 0-bit. This output signal will cause the substitution device 275 to change, in this particular case, the 0-bit in the data bit sequence to a 1-bit. The output signal alternatively can indicate that the state machine 260 reached state 15, and a 1-bit was sensed and there was no 1-bit substitution.

In this first embodiment the decoder merely accepts the transmitted data output 111 of FIG. 2 as the true data. This will result in an error for each 1-bit substitution. This first embodiment has only a one bit delay and would result in bit error probabilities of less than $10^{-10}$ for n>32.

Figure 4:
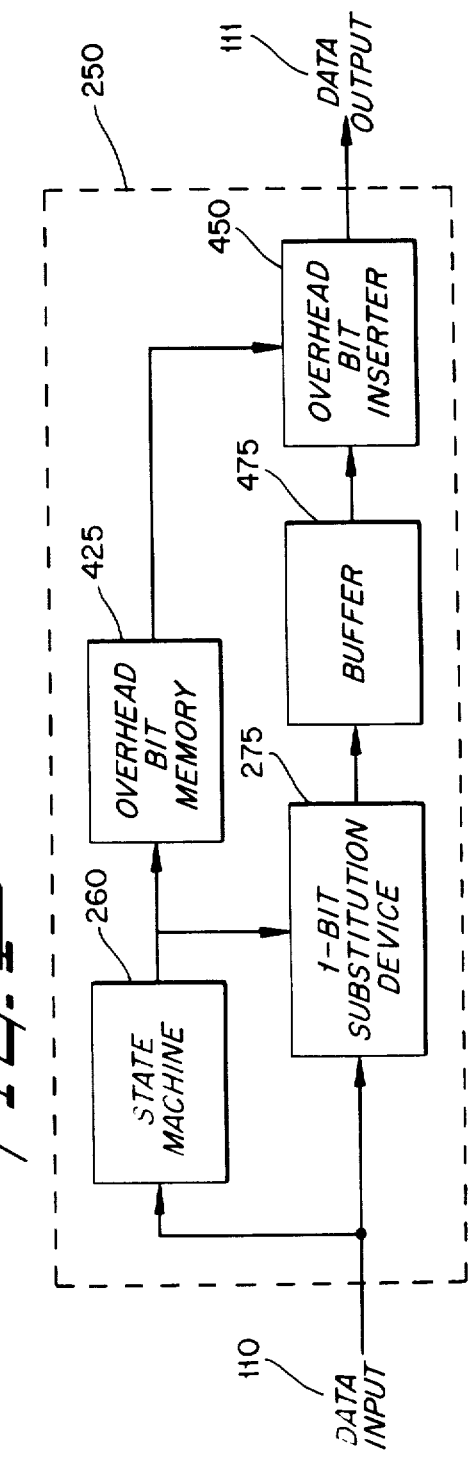
FIG. 4 is a block diagrammatic view of a second embodiment of a bit density controller encoder according to the present invention.

As shown in FIG. 4, the preferred second embodiment of the present invention can also include buffer means coupled to the substitution means, memory means coupled to the state means, and inserting and outputting means coupled to the memory means, the buffer means, and the data output 111. The buffer means is coupled to the substitution means for storing at least one frame of the data bit sequence. The memory means is coupled to the state means and responsive to the output signal, for generating and storing overhead bits and the means for inserting the overhead bits into the data bit sequence and outputting the data bit sequence to the data output is coupled to the memory means, the buffer means and the data output.

The buffer means may be embodied as buffer 475. The buffer 475 is coupled to the substitution device 275 for storing at least one frame of the data bit sequence. In the AT&T T1 network, this one frame includes 192 data and overhead bits plus a frame bit.

The memory means may be embodied as an overhead bit memory 425. The overhead bit memory 425 is coupled to the state machine 260 and generates and stores overhead bits in response to the output signal. The overhead bits keep track of whether a 1-bit was substituted for a 0-bit, or alternatively, keep track that the state machine reached state 15 and a 1-bit was sensed and there was no 1-bit substitution.

The inserting and outputting means may be embodied as an overhead bit inserter 450. The overhead bit inserter 450 is coupled to the buffer 475, the overhead bit memory 425 and the data output 111. The overhead bit inserter 450 generally inserts overhead bits into the frame of the data bit sequence stored in the buffer 475, and outputs the data bit sequence to the data output 111.

In one particular embodiment of the present invention, the overhead bit memory 425 may keep track of up to three particular passes, per frame of the data bit sequence, of the state index through state 15. The overhead bit memory 425 will generate up to three overhead bits which may indicate with a 1-bit that there was a 1-bit substitution and with a 0-bit that there was no 1-bit substitution. Accordingly, the three overhead bits would indicate for a particular frame up to three passes through state 15 and that these passes resulted in either changes or no changes of the bits.

As illustratively shown in FIG. 5, the state means additionally may include means for sensing a preselected data bit position within a frame, for transitioning the state index to state n−1 if the state index is at a preset state. This additional feature is a modification of the state diagram and can be used for protecting frame bits from being changed by the substitution device 375.

For the particular embodiment shown in FIG. 5, a frame comprises 192 data and overhead bits plus a frame bit. Assuming that the frame bit is the 193rd bit, and it is desired that this bit not be changed by the substitution device 275, then in the event that the state index is at state 13 and the sensing means simultaneously senses that the next data bit is both a 0-bit and the 191st bit of a frame, the state index will automatically transition from state 13 to state 15 and effect any bit change in the 192d bit position, and transition back to state 8. This will then allow the frame bit to remain unchanged since the state index will transition either from state 8 to 9 in the event the frame bit is a 0-bit, or from state 8 to state 1 in the event the frame bit is a 1-bit. In either case, the frame bit will remain unaltered.

An alternative embodiment of the modified state diagram for protecting framing bits may include means responsive to two data bits in sequence before the frame bit for sensing those two bits and jumping the state index from state n−3 to state n−1. For FIG. 5, this would mean jumping from states 13 to state 15.

FIG. 6 shows the second embodiment of a bit density controller decoder 225 coupled to a received data input 115 and a corrected data output 125, including state means, overhead bit means, buffer means and correcting means. The state means, overhead bit means, buffer means and correcting means may be embodied as the state machine 260, a device for reading and storing overhead bits 430, a buffer 480 and a device for correcting substituted 1-bits 455, respectively.

The state machine 260 generally is identical to that for the bit density controller encoder.

The device for reading and storing overhead bits 430 reads and stores overhead bits which were previously inserted into the data bit sequence by a bit density controller encoder. The buffer 480 stores one frame of a data bit sequence. The device for correcting substituted 1-bits is coupled to the state machine 260, the device for reading and storing overhead bits 430, and the buffer 480 and is responsive to the output signal from the state machine 260 for correcting substituted 1-bits.

As shown in FIG. 7, the bit density controller described herein may further operate in cooperation with scrambling means coupled between the data input 110 and the bit density controller 250 for transmitting data into the AT&T T1 network 104, or alternatively the bit density controller 250 may include scrambling means coupled between the bit density controller 250 and the data output 120 for descrambling data from the T1 network. The scrambling means may be embodied as a data scrambling device 225 and in response to receiving a data bit sequence generate a random data bit sequence. Alternatively, the scrambling device may be embodied as an encryption device for transforming the data bit sequence into a purely random sequence.

FIG. 7 shows how the bit density controller 250 of the present invention is incorporated in the enhanced bit density controller 210. The enhanced bit density controller can also include the data scrambling device 225. In the transmit mode, the data scrambling device 225 will be inserted after the data input 110 and before the bit density controller 250 which will then feed into the AT&T T1 network 104. In the receiving mode, the bit density controller 250 will receive data from the AT&T T1 network 104, and send data to a data scrambling device 225 for descrambling the data, sending data bit sequence to the data output 120.

Figure 8A:
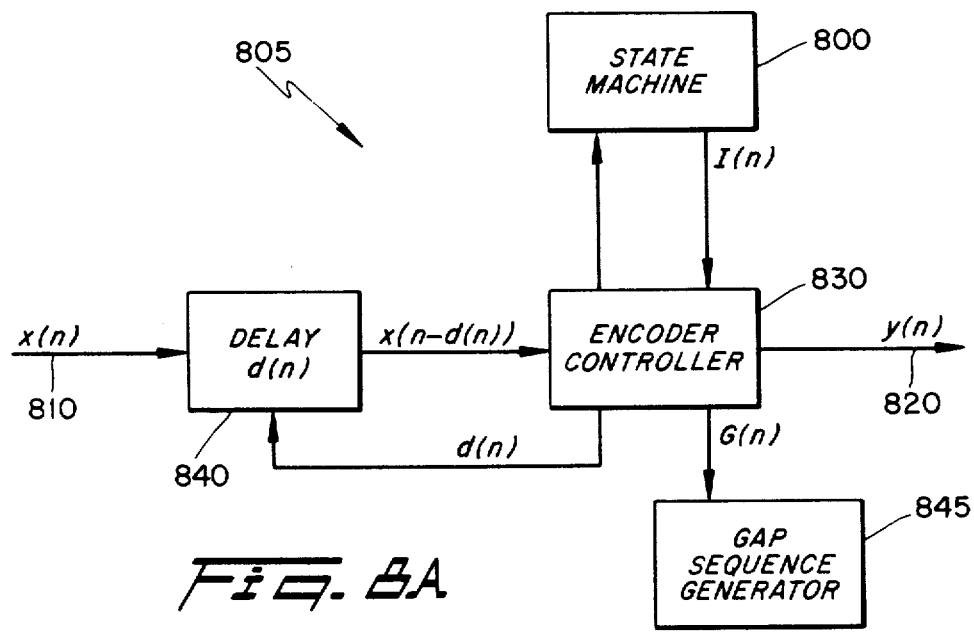
FIG. 8A is a block diagrammatic view of a third embodiment of a bit density controller encoder according to the present invention.
Figure 8B:
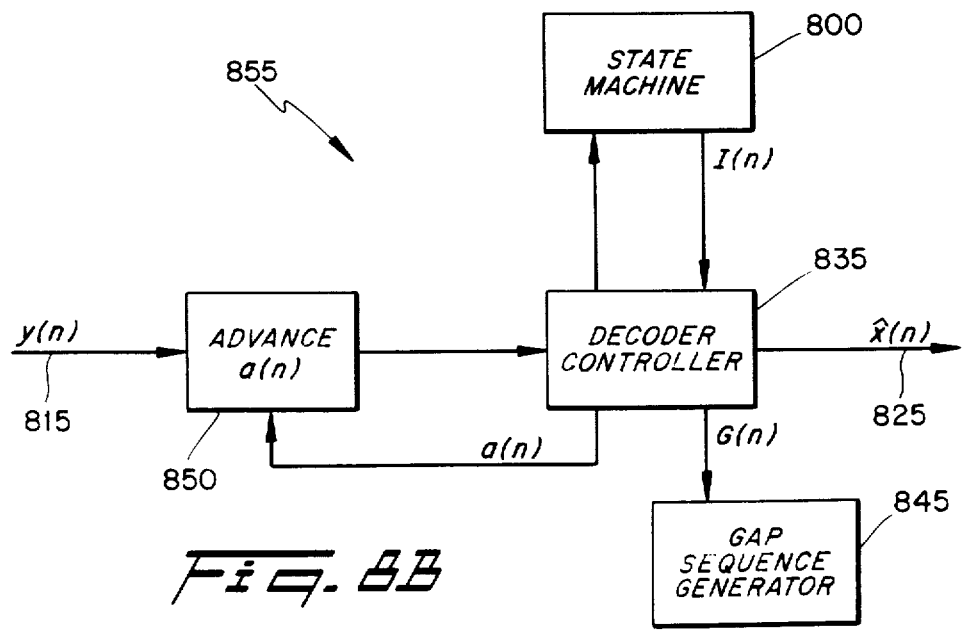
FIG. 8B is a block diagrammatic view of a third embodiment of a bit density controller decoder according to the present invention.

FIG. 8 shows a preferred third embodiment of the bit density controller encoder and the bit density controller decoder which includes for the encoder 805 a data input 810 and a data output 820, controller means and data buffer means coupled between the data input 810 and the data output 820 and state means coupled to the controller means. For the decoder 855 the bit density controller includes a data input 815 and a data output 825, controller means and data buffer means coupled between the data input 815 and the data output 825 and state means coupled to the controller means.

In the exemplary arrangement shown, the state means may be embodied as a state machine 800 having a state index and states zero through n−1, where n is an even number. In the encoder the controller means may be embodied as encoder controller 830, and the data buffer means may be embodied as a delay buffer 840. In the decoder the controller means may be embodied as decoder controller 835, and the data buffer means may be embodied as an advance buffer 850. For the encoder and decoder, the state machine 800 is coupled to the encoder controller 830 and decoder controller 835, respectively, and senses the data bit sequence. The state index is incremented to a next higher state in response to sensing a 0-bit with the state index at any of the states zero through n−2. The state index returns to a zero state in response to sensing a 1-bit with the state index at any of the states zero through (n/2)−1. The state machine 800 decrements the state index by (n/2)−1 states in response to the 0-bit with the state index at any of the states n/2 through n−1. Additionally, the state machine 800 generates an output signal in response to sensing any data bit with the n−1 state and decrements the state index to state n/2. The output signal may be embodied as an insertion bit sequence I(n) having a 1-bit if an inserted 1-bit is required in the data bit sequence, and having a 0-bit if no inserted 1-bit is required in the data bit sequence.

In the encoder the controller 830 is responsive to the output signal and inserts a 1-bit into the data bit sequence and generates a delay bit sequence d(n). In response to the delay bit sequence, the delay buffer 840 delays the data bit sequence which allows the controller 830 to insert a 1-bit into the data bit sequence.

The present invention may also include gap means coupled to the encoder controller 830 and decoder controller 835. The gap means may be embodied as a gap sequence generator 845 for generating a gap sequence G(n). The controller 830 is responsive to the gap sequence for reducing a delay in the data bit sequence caused by the delay buffer 840.

In the decoder the controller 835 is responsive to the output signal and removes a 1-bit in the data bit sequence and generates an advance bit sequence a(n). In response to the advance bit sequence, the advance buffer 850 advances the data bit sequence to compensate for the gap in the data bit sequence from the controller 835 removing a 1-bit in the data bit sequence.

The decoder of the present invention may also include gap means coupled to the controller 835. The gap means may be embodied as a gap sequence generator 845 for generating a gap sequence G(n). The controller 835 is responsive to the gap sequence for reducing advances in the data bit sequence caused by the advance buffer 850.

In the second embodiments of the present invention having a state machine with 16 states, when an encoder's state machine of FIG. 3 reaches state 15, a 1-bit must be inserted into the communications channel. This was accomplished by having a 1-bit replace the corresponding data bit immediately following the occurrence of the state index reaching state 15, and storing the replaced data bit for transmission later in the allocated overhead bit slots set aside in each frame. Typically, three overhead bit slots per frame have been set aside and a one frame delay is required at the receiver bit density controller.

In the preferred third embodiment of the present invention as shown in FIG. 8, the encoder and decoder each use the same state machine as described and illustratively shown in FIG. 3 for 16 states. In this embodiment, however, a 1-bit is inserted into the data bit sequence following the occurrence of the state index reaching state 15. As a consequence, instead of replacing a data bit as described for the previous embodiments for this invention, this approach forces a one bit delay in the data bit sequence by inserting the required 1-bit into the data bit sequence. To accomplish this, the data bit sequence must be buffered to allow for a one bit delay. For the encoder, the delay buffer 840 performs this task.

At the decoder, the controller 830 must remove the inserted 1-bit from the data bit sequence and advance the data bit sequence by one bit each time the state index reaches state 15. This advance is accomplished with the advance buffer 850. Essentially, a delay in the data bit sequence in the encoder's buffer 840 has a corresponding advance (reduction in delay) in the data bit sequence in the decoder's buffer 850. The only delays in the system are due to the buffer delays.

Assume that the delay buffer 840 and advance buffer 850 each have a total capacity of B bits, and that the state machine of FIG. 3, for n=16 states is being used. Since each occurrence of state 15 in the encoder's state machine causes a one bit delay for inserting a 1-bit into the data bit sequence, successive delays would eventually exceed the buffer capacity B. When the delay buffer 840 is full to capacity, then the controller 830 no longer delays the data bit sequence and instead of inserting a 1-bit into the data bit sequence, the controller 830 replaces a data bit in the data bit sequence with a 1-bit. Similarly, the advance buffer 850 does not allow any further advance when sufficient advance delays reach the buffer limit. As a consequence, decoder controller 835 does not remove any inserted data bit when its state machine reaches state 15. Thus, when the buffer limit B (for maximum encoder delay or decoder advance) is reached, a required insertion 1-bit can cause a bit error with probability of $\frac{1}{2}$. To reduce the probability that the encoder delay buffer 840 and decoder advance buffer 850 reach their capacity B, the delay buffer 840 and advance buffer 850 are allowed to periodically reduce their delay. The encoder controller 830 and decoder controller 835 causes this reduction in delay by periodically introducing gaps in the data bit sequence. For example, suppose that in each frame of 193 bits the 128$^{th}$ bit is made available for use by the delay buffer 840 and and advance buffer 850. When the 128$^{th}$ bit occurs in a frame, the encoder delay buffer 840 and decoder advance buffer 850 can shift the data bit sequence by one bit and compensate for the transmission delay of one bit which may have occurred earlier, when the encoder inserted a data bit into the data bit sequence. These gaps can occur at any specified position in the data bit sequence. Thus they may occur once per byte, once per frame, once per every two frames, or even once per every superframe of 24 frames. Essentially, gaps are overhead positions that are set aside for bit density corrections.

In the present disclosure it is shown later that in most cases the encoder delay buffer 840 will be at the zero delay position. If a gap occurs when the encoder's delay buffer 840 is in the zero delay position then no further shift forward of the data bit sequence can take place and the encoder controller 830 inserts a 1-bit into the gap slot. If a gap slot occurs when the decoder's advance buffer 850 is at the maximum delay which corresponds to the zero advance position, then decoder controller 835 removes the bit in this slot.

For the encoder 805 and decoder 855 in FIG. 8, the data bit sequence is depicted as {x(n)} and the transmitted data bit sequence as {y(n)}. Assume that the encoder 805 and decoder 855 are coupled through an error free channel so that the received channel output is the data bit sequence {y(n)}.

Figure 9:
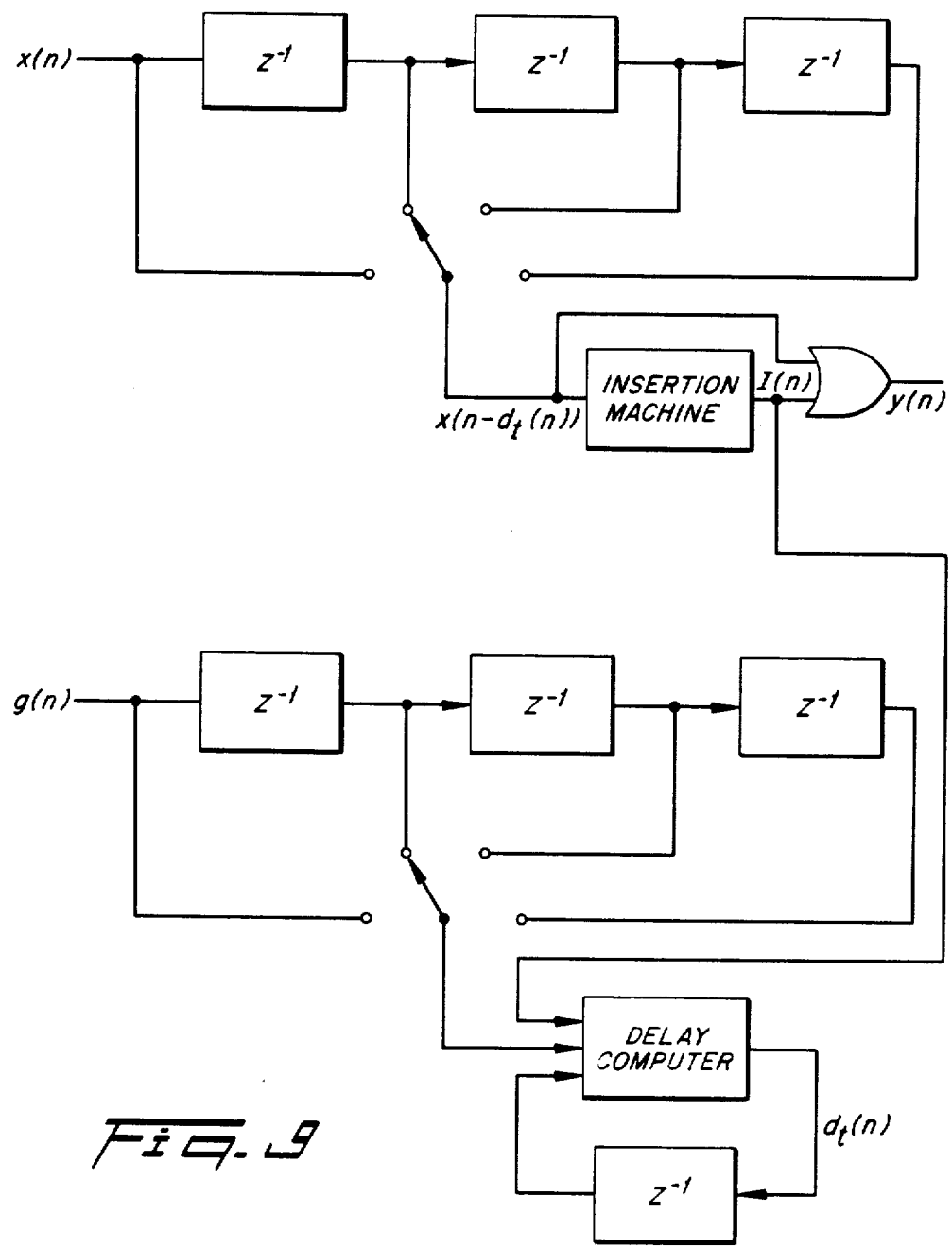
FIG. 9 is an example block diagrammatic view of the third embodiment of the encoder for a buffer size of B=3 bits.

The data stream {x(n)} is passed through a shift register of length B, providing time delays of 0 to B; in the encoder example shown in FIG. 9, B is chosen to be 3. At each time n, one of the shift register outputs is selected; the selection is determined by the delay variable $d_t(n)$. The sequence {x(n−$d_t(n)$)} is transmitted after being overwritten by 1-bits as required by the insertion state machine. For reference, the output of the insertion machine is the sequence {I(n)}, defined by $$I(n) = \begin{cases} 1, \text{ if a 1-bit is inserted at time } n \\ 0, \text{ otherwise.} \end{cases}$$

The encoder also has available to it the gap sequence {g(n)}, which defines whether or not x(n) is a gap bit; i.e., $$g(n) = \begin{cases} 1, \text{ if } x(n) \text{ is a gap bit} \\ 0, \text{ if } x(n) \text{ is not a gap bit.} \end{cases}$$

Like {x(n)}, {g(n)} is passed through a shift register to make available delayed versions of it, with a maximum delay of B. At time n, one of the delayed versions is selected, determined by the value of $d_t(n-1)$.

The key to the operation of the encoder is the computation of $d_t(n)$. It is a function of I(n), g(n−$d_t(n-1)$), and $d_t(n-1)$, defined as in Table 1. The first row of the table corresponds to the case that no inserted 1-bit occurs (I(n)=0) and no gap occurs (g(n−$d_t(n-1)$)=0); in this case, the amount of delay does not change. The second row of the table is the case that an inserted 1-bit occurs and a gap does not; in this case, the amount of delay is increased by one (unless it exceeds B), so that the data bit that would have been transmitted during the inserted 1-bit is transmitted immediately afterwards. The third row is the case that a gap occurs and an inserted 1-bit does not; in this case, the amount of delay is decreased by one (unless it becomes negative), so that the gap bit is skipped. The final row is the case where an inserted 1-bit occurs on a gap; in this case, the amount of delay is unchanged, and the gap bit is simply overwritten by the 1-bit.

An example of encoder operation is given in the first seven columns of Table 3. To keep the table short, gaps in the data sequence occur at multiples of 5; in practice, gaps occur much less frequently. The letters A through Z are used to represent the binary-valued non-gap data bits; gaps are represented by '—'. The sequence $\{I(n)\}$ is assumed; obviously, it contains more ones than could actually be generated by the insertion machine, but it is used in the table for brevity. Sequence $\{d_i(n)\}$ is computed according to Table 1 and used to determine $\{y(n)\}$, as in FIG. 9. Examples of each of the four cases of Table 1 can be seen by examining the columns $I(n)$ and $g(n-d_i(n-1))$ in Table 3.

It should be noted that $I(n)$ does not depend on $d_i(n)$, since its value depends only on inputs to the insertion state machine for times prior to n. This ensures that $d_i(n)$ can be computed as per the table using combinational logic.

Figure 10:
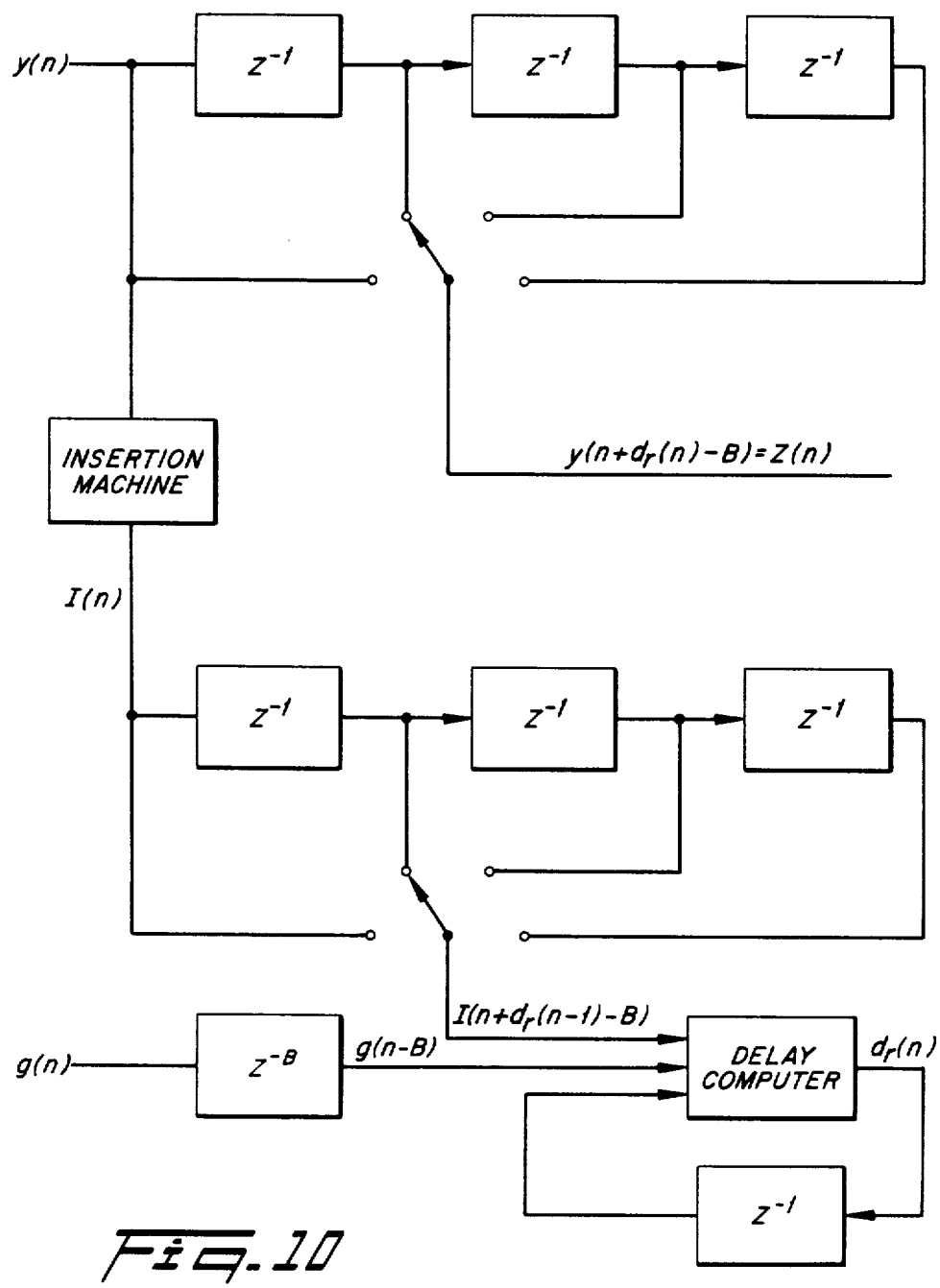
FIG. 10 is an example block diagrammatic view of a third embodiment of the decoder for a buffer size of B=3 bits.

The decoder for this example is illustrated in FIG. 10. The received data stream $\{y(n)\}$ is passed through a shift register to obtain delayed versions. At each time n, one of the shift register outputs is selected as the decoded version of the data bit $x(n-B)$; the selection is determined by the delay variable $d_r(n)$. The undelayed received stream $\{y(n)\}$ drives the insertion state machine, producing the same insertion sequence as at the encoder (at least in the absence of channel errors). The decoder also has available to it the sequence $\{g(n-B)\}$, which defines whether or not $x(n-B)$ is a gap bit. As with the encoder, the key to operation of the decoder is the computation of the delay variable $d_r(n)$. Here, $d_r(n)$ is computed by the same logic as used to compute $d_i(n)$, but the inputs to the function are different; the details are listed in Table 2.

The last six columns of Table 3 illustrate decoder operation. Sequence $\{d_r(n)\}$ is computed according to Table 2 and used to determine $\{z(n)\}$, as in FIG. 10. Examples of each of the four cases of Table 2 can be seen by examining the columns $I(n+d_r(n-1)-B)$ and $g(n-B)$ in Table 3.

TABLE 1

| | computation of $d_i(n)$. | |
|---|---|---|
| I(n) | $g(n - d_i(n-1))$ | $d_i(n)$ |
| 0 | 0 | $d_i(n-1)$ |
| 1 | 0 | min $(d_i(n-1) + 1, B)$ |
| 0 | 1 | max $(d_i(n-1) - 1, 0)$ |
| 1 | 1 | $d_i(n-1)$ |

TABLE 2

| | computation of $d_r(n)$. | |
|---|---|---|
| $I(n + d_r(n-1) - B)$ | $g(n - B)$ | $d_r(n)$ |
| 0 | 0 | $d_r(n-1)$ |
| 1 | 0 | min $(d_r(n-1) + 1, B)$ |
| 0 | 1 | max $(d_r(n-1) - 1, 0)$ |
| 1 | 1 | $d_r(n-1)$ |

TABLE 3

| n | x(n) | g(n) | I(n) | $g(n-d_i(n-1))$ | $d_i(n)$ | y(n) | $I(n+d_r(n-1)-B)$ | $g(n-B)$ | $d_r(n)$ | z(n) | x(n-B) |
|---|---|---|---|---|---|---|---|---|---|---|---|
| 0 | — | 1 | 0 | 1 | 0 | — | 0 | 0 | 0 | ? | ? |
| 1 | A | 0 | 0 | 0 | 0 | A | 0 | 0 | 0 | ? | ? |
| 2 | B | 0 | 0 | 0 | 0 | B | 0 | 0 | 0 | ? | ? |
| 3 | C | 0 | 0 | 0 | 0 | C | 0 | 1 | 0 | — | — |
| 4 | D | 0 | 0 | 0 | 0 | D | 0 | 0 | 0 | A | A |
| 5 | — | 1 | 0 | 1 | 0 | — | 0 | 0 | 0 | B | B |
| 6 | E | 0 | 0 | 0 | 0 | E | 0 | 0 | 0 | C | C |
| 7 | F | 0 | 1 | 0 | 1 | 1 | 0 | 0 | 0 | D | D |
| 8 | G | 0 | 0 | 0 | 1 | F | 0 | 1 | 0 | — | — |
| 9 | H | 0 | 0 | 0 | 1 | G | 0 | 0 | 0 | E | E |
| 10 | — | 1 | 0 | 0 | 1 | H | 1 | 0 | 1 | F | F |
| 11 | I | 0 | 1 | 1 | 1 | 1 | 0 | 0 | 1 | G | G |
| 12 | J | 0 | 0 | 0 | 1 | I | 0 | 0 | 1 | H | H |
| 13 | K | 0 | 0 | 0 | 1 | J | 1 | 1 | 1 | 1 | — |
| 14 | L | 0 | 1 | 0 | 2 | 1 | 0 | 0 | 1 | I | I |
| 15 | — | 1 | 0 | 0 | 2 | K | 0 | 0 | 1 | J | J |
| 16 | M | 0 | 1 | 0 | 3 | 1 | 1 | 0 | 2 | K | K |
| 17 | N | 0 | 1 | 0 | 3 | 1 | 1 | 0 | 3 | 1 | L* |
| 18 | O | 0 | 0 | 1 | 2 | M | 0 | 1 | 2 | 1 | — |
| 19 | P | 0 | 1 | 0 | 3 | 1 | 0 | 0 | 2 | M | M |
| 20 | — | 1 | 0 | 0 | 0 | N | 0 | 0 | 3 | N | N |
| 21 | Q | 0 | 1 | 0 | 3 | 1 | 1 | 0 | 3 | 1 | O* |
| 22 | R | 0 | 0 | 0 | 3 | P | 0 | 0 | 3 | P | P |
| 23 | S | 0 | 0 | 1 | 2 | Q | 0 | 1 | 2 | P | — |
| 24 | T | 0 | 1 | 0 | 3 | 1 | 0 | 0 | 2 | Q | Q |
| 25 | — | 1 | 0 | 0 | 3 | R | 1 | 0 | 3 | R | R |
| 26 | U | 0 | 0 | 0 | 3 | S | 0 | 0 | 3 | S | S |
| 27 | V | 0 | 0 | 0 | 3 | T | 0 | 0 | 3 | y(n)}T | |
| 28 | W | 0 | 1 | 1 | 3 | 1 | 1 | 1 | 3 | 1 | — |
| 29 | X | 0 | 0 | 0 | 3 | U | 0 | 0 | 3 | U | U |
| 30 | — | 1 | 0 | 0 | 3 | V | 0 | 0 | 3 | V | V |
| 31 | Y | 0 | 0 | 0 | 3 | W | 0 | 0 | 3 | W | W |
| 32 | Z | 0 | 0 | 0 | 3 | X | 0 | 0 | 3 | X | X |
| 33 | A | 0 | 0 | 1 | 2 | Y | 0 | 1 | 2 | X | — |
| 34 | B | 0 | 0 | 0 | 2 | Z | 0 | 0 | 2 | Y | Y |
| 35 | — | 1 | 0 | 0 | 2 | A | 0 | 0 | 2 | Z | Z |
| 36 | C | 0 | 0 | 0 | 2 | B | 0 | 0 | 2 | A | A |
| 37 | D | 0 | 0 | 1 | 1 | C | 0 | 0 | 2 | B | B |

TABLE 3-continued

| n | x(n) | g(n) | I(n) | g(n−d_i(n−1)) | d_i(n) | y(n) | I(n+d_i(n−1)−B) | g(n−B) | d_i(n) | z(n) | x(n−B) |
|---|---|---|---|---|---|---|---|---|---|---|---|
| 38 | E | 0 | 0 | 0 | 1 | D | 0 | 1 | 1 | B | — |
| 39 | F | 0 | 0 | 0 | 1 | E | 0 | 0 | 1 | C | C |

Example encoder/decoder operation. {I(n)} is an assumed insertion sequence; B = 3; and gaps occur at multiples of 5. {x(n)} is the data to be encoded, with '—' indicating a gap and letters A to Z denoting binary-valued data. {y(n)} is the encoded sequence to be transmitted. {z(n)} is the decoded output at the receiver. An error occurs whenever z(n) and x(n−B) are unequal and x(n−B) is not a gap. Error denoted by '*.'

The bit density controller as described herein is very robust, has minimal delay, and is easy to implement. The bit density controller can be used not only for the AT&T T1 network, but also for meeting any system having a ones density requirement. Such systems include recording data onto magnetic tape, or other systems where, for example, transitions in a data bit sequence are examined rather than actual data bits.

In magnetic recording of data, typically there is a requirement to maintain a certain density of transitions. A transition occurs when a 0-bit is followed by a 1-bit or when a 1-bit is followed by a 0-bit. A prescribed density of transitions must be maintained in recording data onto a magnetic medium, and this can be accomplished by converting a data bit sequence to a transition sequence.

PERFORMANCE ANALYSIS OF STATE MACHINE

Although the present invention can be embodied for any number of states, n, for meeting any bit density requirement for frames of data, the following discussion will analyze the bit density for 16 states embodied in state machine 260. This discussion will teach some of the advantages of the present invention.

Ignoring all framing of the data bits, consider the 16 state, state machine 250 as continuously operating on the data bit sequence. As pointed out previously, any 0-bit causes a transition to a next higher state except for the transition from state 15 to state 8. A 1-bit causes a transition back to state zero from states 0, 1, 2, 3, 4, 5, 6 and 7, and a transition down by 7 states from the remaining states 8–15. Essentially all 1-bits force a transition to a state with an index decreased by 7 with all the negative states combined to state zero.

The transition from state 15 to state 8 is referred to as the substitution step in the first and second embodiments since this is the place where a 1-bit is forced to replace a 0-bit, if a 0-bit is present in that particular point in the sequence. In this substitution step a 1-bit is left alone while a 0-bit is changed to a 1-bit. The actual data bits in the substitution steps are denoted by the bit sequence $\{D_i\}$ where $D_i$ is the data bit corresponding to the $i^{th}$ substitution step.

Suppose, for this discussion, that some external channel provides the data bit sequence $\{D_i\}$ to a receiver and there are no channel errors. The state machine 260 in the bit density controller 250 at the receiver then handles the received data bit sequence in the same manner as shown in FIG. 3. Consider further the bit density controller 250 at the transmitter as an encoder and at the receiver as a decoder. Thus the bit density controller 250 for the encoder and decoder have the same state diagram. The decoder at the receiver, for error free transmission through the T1 network, replaces the received 1-bit in each substitution step by the actual data bit. This is because when the decoder reaches state 15 a 1-bit will then be present as the decoder state machine 260 transitions from state 15 to state 8. The decoder only has the problem of determining whether this 1-bit was originally a 1-bit or a replaced 0-bit. This determination can be made, for example, from there overhead bits transmitted per frame as described in the second embodiment. Keep in mind that $D_i$ is the actual data bit for the $i^{th}$ substitution step (state transition from state 15 to state 8).

Automatic Resynchronization

From the state diagram in FIG. 3 it is clear that two consecutive 1-bits will force the state machine 260 to state zero. Thus the transmitter bit density controller 250 and receiver bit density controller 250 are automatically synchronized whenever two consecutive 1-bits are transmitted error free.

Steady State Distribution for State Machine

The state diagram for the state machine is shown in FIG. 3. With a random data bit sequence this state machine describes a Markov process having the state transition matrix of FIG. 11. The following calculates the steady state probability distribution for the 16 states by defining any initial probability distribution $v_o$ for the states and computing $$v_n = v_{n-1} P$$

for n = 1, 2, 3, ..., N, where N is chosen large enough so that $v_N$ is approximately the desired steady state probability distribution. For the uniform initial probability distribution $$v_0 = (1,1,1,1,1,1,1,1,1,1,1,1,1,1,1,1)/16$$

and for N = 2000, the steady state probability distribution $v_{2000}$ has calculated components $$v(0) = 4.98 \times 10^{-1}$$

$$v(1) = 2.50 \times 10^{-1}$$

$$v(2) = 1.26 \times 10^{-1}$$

$$v(3) = 6.30 \times 10^{-2}$$

$$v(4) = 3.16 \times 10^{-2}$$

$$v(5) = 1.59 \times 10^{-2}$$

$$v(6) = 7.97 \times 10^{-3}$$

$$v(7) = 4.00 \times 10^{-3}$$

$$v(8) = 2.02 \times 10^{-3}$$

$$v(9) = 1.01 \times 10^{-3}$$

$$v(10) = 5.04 \times 10^{-4}$$

$$v(11) = 2.52 \times 10^{-4}$$

$$v(12) = 1.26 \times 10^{-4}$$

$$v(13) = 6.30 \times 10^{-5}$$

$$v(14) = 3.15 \times 10^{-5}$$

$$v(15) = 1.58 \times 10^{-5}$$

Note that the steady state probability $v(n)$ of state $n$ is approximately $$v(n) = 2^{-(n+1)}$$

and that state 15 occurs on the average once every $$1/v(15) = 63487 \text{ bits}$$

or approximately once every 329 frames. This indicates that the occurrence of the insertion of a 1-bit or substitution of a 1-bit occurs very infrequently and that the required number of overhead bits is small. In theory only one overhead bit for every 329 frames is necessary.

Distribution for the Time to Reach State 15

Figure 12:
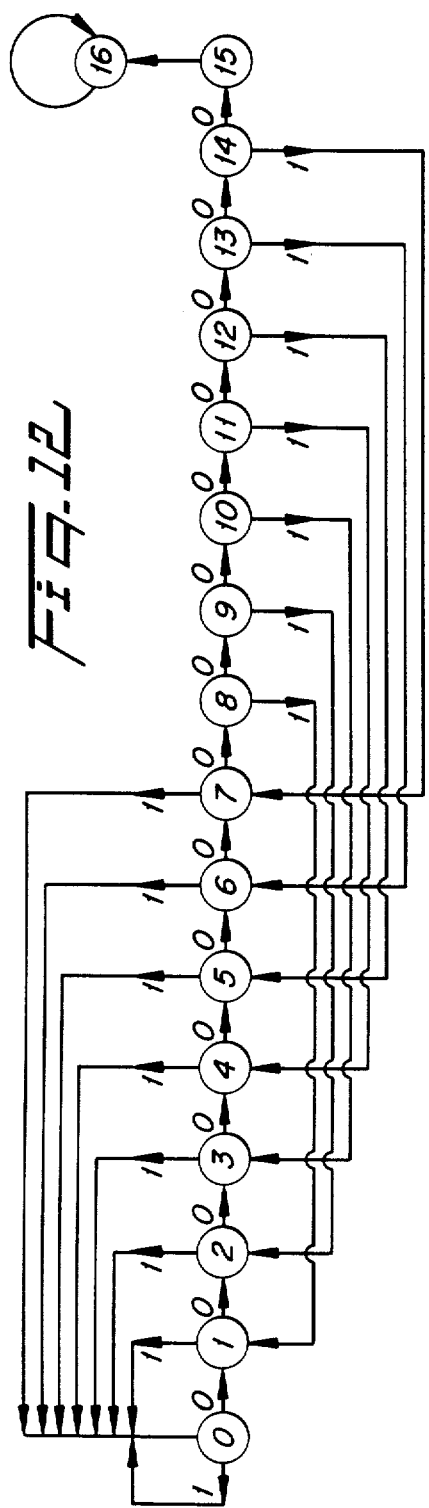
FIG. 12 is a modified state diagram of the bit density controller's state machine for 17 states, having a trap state 16 according to the present invention.

An important statistic to obtain is the probability distribution for the number of steps it takes to reach state 15 for the first time starting with some initial state. To obtain this probability distribution consider the modified state diagram shown in FIG. 12 for the state machine. The state diagram of FIG. 3 has been modified in FIG. 12 by adding a trap state 16 which follows state 15. This trap state prevents the occurrence of returning to state 15 again and allows the computation of only the probability of reaching state 15 for the first time only. FIG. 13 presents the transition matrix for this modified 17 state machine. FIGS. 12 and 13 are used here to assist in computing the desired probabilities.

1. Steady state initial condition

Assume that the starting state is random with steady state probability distribution derived previously. Then start with the initial 17 dimension vector $$a_0 = (v_{2000}, 0)$$

and compute $$a_n = a_{n-1} P$$

for $n = 1, 2, 3, \ldots, N$. The $16^{th}$ component of $a_n$ denoted $a_n(15)$, is the probability of reaching state 15 for the first time in $n$ steps after starting at a randomly chosen time. The computed probabilities $a_n(15)$ for $n = 1, 2, 3, \ldots, 200$ were calculated and for this range of $n$ one has $$1.558 \times 10^{-5} \leq a_n(15) \leq 1.575 \times 10^{-5}$$

which shows that starting at a randomly chosen time the probability of reaching state 15 for the first time is almost uniformly distributed over 200 steps which is about one frame. The first probability $a_0(15)$ is the steady state probability of state 15 given by $v(15)$.

2. Initial State 8

In the state machine having 16 states, state 8 always follows state 15. By starting with state 8 as the initial state, one obtains the probability distribution for the number of steps to return to state 15 for the first time. Start with the initial 17 dimensional vector $$b_1 = (0,0,0,0,0,0,0,0,1,0,0,0,0,0,0,0,0)$$

and compute $$b_n = b_{n-1} P$$

for $n = 2, 3, 4, \ldots, N$. The 16th component of $b_n$, denoted by $b_n(15)$, is the probability of reaching state 15 for the first time in $n$ steps immediately following state 15.

Number of Insertions Per Frame

To determine the number of overhead bits per frame that are required, one can compute the probability distribution for the number of times an insertion step (state 15) occurs in one or more frames. Assume that at the beginning of a frame the state of the state machine can be at any of the 16 states with the steady state probability distribution. This is because the state machine runs independently of the framing structure of the data. This means that the number of steps to the next insertion step is a random variable, denoted $X_l$, which has probability distribution $\{a_n(15)\}$.

The number of steps from the first insertion step to the second insertion step is a random variable, denoted $X_2$, which has probability distribution $\{b_n(15)\}$. This random variable is the time it takes to return to state 15. Similarly one can define $X_k$ as the random time from the $(k-1)^{st}$ insertion step to the $k^{th}$ insertion step. Here all random variables $\{X_k\}$ are independent with $X_1$ having probability distribution $\{a_n(15)\}$ and $X_k$ having probability distribution $\{b_n(15)\}$ for $K \geq 2$.

Now let $M$ be the number of times an insertion step occurs in a frame. Then $$Pr\{M \geq m\} = Pr\left( \sum_{i=1}^{m} X_i \leq 193 \right).$$

To compute this probability for any integer $m$, one can define the two variable function $$F(k,n) = Pr\left( \sum_{i=1}^{k} X_i \leq n \right)$$

and make use of the relationship $$F(k,n) = \sum_{j=0}^{n} Pr\left( \sum_{i=1}^{k} X_i \leq n \mid X_k = j \right) Pr\{X_k = j\}$$

$$= \sum_{j=0}^{n} Pr\left( \sum_{i=1}^{k} X_i \leq n - j \right) Pr\{X_k = j\}$$

$$= \sum_{j=0}^{n} F(k-1, n-j) Pr\{X_k = j\}$$

where $$F(1,n) = Pr\{X_1 \leq n\}$$

$$= \sum_{j=0}^{n} a_j(15)$$

and $$Pr\{X_k = j\} = b_j(15)$$

for $k \geq 2$. The results of these computations give for a single 193 bit frame the probabilities $$Pr\{M=1\} = 3.013 \times 10^{-3}$$

$$Pr\{M=2\} = 2.685 \times 10^{-5}$$

$$Pr\{M=3\} = 2.338 \times 10^{-7}$$

$$Pr\{M=4\} = 1.995 \times 10^{-9}$$

$$Pr\{M=5\} = 1.670 \times 10^{-11}$$

$$Pr\{M=6\} = 1.374 \times 10^{-13}$$

$$Pr\{M=7\} = 1.110 \times 10^{-15}$$

$$Pr\{M=8\} = 8.827 \times 10^{-18}$$

By replacing 193 by 386 in the above computations one obtains the probabilities for the number of insertion steps that occur in two frames. These probabilities are $$Pr\{M=1\} = 6.016 \times 10^{-3}$$

$$Pr\{M=2\} = 6.385 \times 10^{-5}$$

$$Pr\{M=3\} = 6.482 \times 10^{-7}$$

$$Pr\{M=4\} = 6.418 \times 10^{-9}$$

$$Pr\{M=5\} = 6.201 \times 10^{-11}$$

$$Pr\{M=6\} = 5.867 \times 10^{-13}$$

$$Pr\{M=7\} = 5.450 \times 10^{-15}$$

$$Pr\{M=8\} = 4.978 \times 10^{-17}$$

If one limits himself to a frame by frame overhead correction system with three overhead bits per frame, then in an error free channel the bit error probability caused by limiting the number of overhead corrections to three bits is $$P_b(3) = 5.168 \times 10^{-12}.$$

If one were to limit himself to two overhead bits per frame then the probability is $$P_b(2) = 6.057 \times 10^{-10}.$$

Like several modern communication equipment such as error controllers and statistical multiplexers, the bit density controller is a probabilistic design while existing channel service units designs are deterministic. Since real channel errors are typically higher than $P_b(3)$, so long as channel errors do not cause significant error extensions, the overall bit error rates will remain unchanged with this bit density controller.

Impact of Channel Errors on State Machine

A single channel error will cause the receiver's bit density controller 250 to be in a different state than the correct transmitter's bit density controller 250 state except if the error occurred during an substitution step. Specifically, if a channel changes a 1-bit to a 0-bit (type 1 bit error) then the receiver's encoder state will be one to eight steps higher. This means that if resynchronization does not take place the decoder will reach state 15 before a true encoder substitution step is to occur. If this happens and the decoder observes a received 0-bit instead of the expected substitution 1-bit then it replaces the 0-bit into this slot and assumes no actual substitution took place and does not use the available data substitution bit among $D_1$, $D_2$, $D_3$. Its state, however, continues according to FIG. 3. If the decoder does not observe any disagreement when it reaches the substitution step then it assumes that a true substitution took place. This will effectively destroy the usefulness of the remaining substitution bits.

If a channel error changes a 0-bit to a 1-bit (type 2 bit error) then the receiver's encoder state will be one to eight steps lower than the true encoder state. Again, if no resynchronization takes place then the encoder will reach state 15 before the decoder and the decoder will not correct for this. If this happens then the remaining substitution bits are useless.

Let $v(n)$ be the steady state probability that the bit density encoder is in state n at a given time. If an isolated channel bit error occurs at this time then either the encoder or decoder (not both) will next be in the next higher state. An exception is state 15 where the next higher state will be taken to be 8. If $15-(n+1)=14-n$ 0-bits occur next then an encoder or decoder reaches the substitution step and an error condition occurs. The probability of this is $$Pr\{\text{extension errors} | \text{isolated error when at state } n\} = (\tfrac{1}{2})^{14-n}$$

Other much less probable sequences should be included here but their probabilities are much smaller and negligible compared to directly going to state 15 with $14-n$ 0-bits in the random data bit sequence.

The probability that an isolated channel bit error results in decoder bit errors in the overhead bits due to the bit density controller circuits is $$P_{ex} = \sum_{n=0}^{14} (\tfrac{1}{2})^{14-n} v(n) + v(15)$$

To evaluate this probability we need the steady state probabilities, $v(0), v(1), \ldots, v(15)$.

To a very high degree of accuracy the steady state probabilities obtained by solving the above matrix equation is given by $$v(n) = (\tfrac{1}{2})^{n+1}$$

$$n = 0, 1, 2, \ldots, 15$$

and $$v(15) = (\tfrac{1}{2})^{16}.$$

With this we have $$P_{ex} = 4.58 \times 10^{-4}$$

as the probability that an isolated channel error causes additional errors in the overhead bits due to the temporary loss of synchronization between the bit density encoder at the transmitter and the decoder at the receiver.

This analysis shows that there is virtually no error extension in the bit density controller 250 with isolated channel errors. Results are similar for a burst of channel errors primarily because there is a low probability of being in a state near the substitution step and a high probability of resynchronization before the encoder or decoder reaches state 15. Recall that resynchronization will occur after any errors as soon as two consecutive ones are transmitted over the channel without errors.

Frame Bits

The data bit sequence that enters the state machine 260 of FIG. 3 include frame bits. One frame bit is located after each block of 192 data and overhead bits. These frame bits must not be changed by the bit density controller 250 at the transmitter or receiver.

A modification to the state diagram 300 that guarantees that no frame bits will be modified was shown in FIG. 5. Here if the data bit following state 13 is the 191st bit and it is a 0-bit then the transition is to state 15. This forces the 192 bit to be a 1-bit and any bit that follows a 1-bit (the frame bit in this case) remains unchanged.

A slightly more complex variation of this modification is to allow the state 13 to state 15 transition to occur only if the frame bit is a 0-bit since the above modification is not necessary if the frame bit is a 1-bit.

Density Correction

For every frame of 193 bits the bit density controller might, for example, transmit three bits, $D_1$, $D_2$, and $D_3$ over the channel. These bits are used to specify data bits that are reinserted at the decoder for up to three substitution steps per frame. If there are fewer than three substitution steps in a given frame the remaining unused bits are set to one. If there are more than three substitution steps for a given frame then those substitution steps beyond three are not changed at the decoder and each has a bit error probability of $\frac{1}{2}$. As shown earlier, this event occurs with probability smaller than the normal channel bit error rates.

The three bits per frame for the density correction communications are taken from the 192 data bits in a frame. There are two approaches on where these three bits will be placed in each frame.

A. Assigned Slots

Assign the first three bits of each frame to the density correction channel where the first bit is $D_3$, the second bit is $D_2$, and the third bit is $D_1$. The reverse order is selected because $$\Pr\{D_3=0\} = 1.17 \times 10^{-7}.$$

This means that with high probability $D_3=1$ and the bits $D_2$, and $D_1$ will not include a substitution step. Even if $D_3=0$ the probability of a substitution step occurring in the first three bits of a frame is small.

The three bits $D_3$, $D_2$, $D_1$ that appear at the beginning of a frame specify up to three substitution data bits of the previous frame. This means that the bit density decoder process will need to buffer one frame with the substitution slots flagged until correct substitution bits $D_1$, $D_2$, and $D_3$ are obtained from the beginning of the next frame.

B. Distributed Slots

Another approach is to begin with the $192-3=189$ data bits and insert the three bits $D_1$, $D_2$, and $D_3$ as follows: For each substitution step, rather than replace the data bit with a 1-bit, insert a 1-bit and shift the remaining data bits one bit slot to the right. This is done up to a maximum of three times thereafter the substitution step replaces the data bit with a 1-bit. If the number of substitution steps in a frame is $n<3$ then the last $3-n$ bits in the frame are set to 1-bits.

The decoder reverses the encoder process by removing the inserted 1-bit for the first three substitution steps and ignoring the rest.

This approach requires no frame buffering but increases the error extension due to isolated errors. As before when an isolated error occurs the probability of an error extension is $$P_{ex} = 4.58 \times 10^{-4}.$$

Now, however, instead of these errors occurring in the overhead bits $D_1$, $D_2$, and $D_3$, they can cause random errors for all data bits remaining in the frame. This is because if the encoder and decoder are not synchronized when either one reaches state 15, the remaining encoded and decoded data bit sequences are shifted relative to each other by one bit position.

If k bit errors occur in a frame the probability of at least one error extension is $$\sum_{j=1}^{k} \binom{k}{j} P_{ex}^j (1-P_{ex})^{k-j} = k\, P_{ex}.$$

For a channel error rate of $P_b$ the probability of k errors in a frame is $$\binom{192}{k} P_b^k (1-P_b)^{192-k}.$$

Thus error extension plus errors caused by the three bit overhead limitation results in the overall bit error probability $$P_{overall} = P_b + P_b(3) +$$

$$\sum_{k=0}^{192} \binom{192}{k} P_b^k (1-P_b)^{192-k} k P_{ex} = (1 + 192\, P_{ex}) P_b +$$

$$P_b(3) \text{ or } P_{overall} \leq 1.09\, P_b + 5.168 \times 10^{-12}$$

Since the above second term is so small, this is essentially the same as $P_b$, the channel error rate.

It should be noted that for this distributed slots version of the bit density controller 250 the modification of FIG. 5 is also needed to avoid modification of the frame bits. Also, if an substitution step takes place on the 192d bit in a frame a 1-bit is inserted but no further shifting takes place.

Generalized Density Correction

In the previous discussion, three overhead bits per frame were allowed for density correction. The average number of required substitution steps per frame, however, is only one bit for every 329 frames. Hence the three bits per frame is excessive for density correction.

To reduce the required number of frames per bit consider using ten density correction bits for every ten frames. For an error free channel the bit density controller can cause errors whenever there are eleven or more substitution bits (reaching state 15 eleven or more times) during a ten frame data block. This occurs with probability less than $3 \times 10^{-20}$.

The ten substitution bit limit for each ten frame block results in one overhead density bit per frame with virtually no change in overall error rate. Smaller average overhead bits per frame can be achieved by using a maximum of twenty five density correction bits for every fifty frames. Here we achieve half a bit per frame.

Performance Analysis with Buffer Delays

The encoder 805 of FIG. 8 increases its delay of the data bit sequence for each insertion bit following the state machine 800 reaching state 15. This occurs up to a maximum delay after which no further delays can occur. The reverse of a delay (advance) of the data bit sequence occurs each time a gap occurs until the buffer machines reach the zero delay position. Relative to a fixed delay the decoder 855 moves its buffer position in the reverse order as that of the encoder's buffer position. On the average insertion bits occur once every 63,487 bits while times for gaps can be selected.

Suppose that the advance buffer 850 and delay buffer 840 have a maximum buffer size of B=8 bits and a gap occurs once every frame. A frame includes 193 bits. The following computes the encoder's buffer delay position at the time of an insertion bit. This is done by examining the probability of the encoder's delay buffer 840 being at a given delay position when the state machine 800 reaches state 15.

Consider the time points to be the random time points when state 15 occurs in a state machine 800. The time between such occurrences are independent random variables with probability distribution $\{b_n(15)\}$. Assume that the number of gap times that occur between these time points is the minimum possible.

Thus if the time points are separated by up to 193 steps, then assume that no gaps have occurred. If the separation is between 194 and 387 steps then assume that only one gap had occurred. This assumption provides the worse case steady state probabilities that increase the probabilities of higher delay positions in the buffers. By defining probabilities $$p_1 = \sum_{n=0}^{192} b_n(15)$$

$$p_0 = \sum_{n=193}^{386} b_n(15)$$

$$p_{-1} = \sum_{n=387}^{580} b_n(15)$$

$$p_{-2} = \sum_{n=581}^{774} b_n(15)$$

$$p_{-3} = \sum_{n=775}^{968} b_n(15)$$

$$p_{-4} = \sum_{n=969}^{1162} b_n(15)$$

$$p_{-5} = \sum_{n=1163}^{1356} b_n(15)$$

$$p_{-6} = \sum_{n=1357}^{1550} b_n(15)$$

$$p_{-7} = \sum_{n=1551}^{\infty} b_n(15)$$

Figure 14:
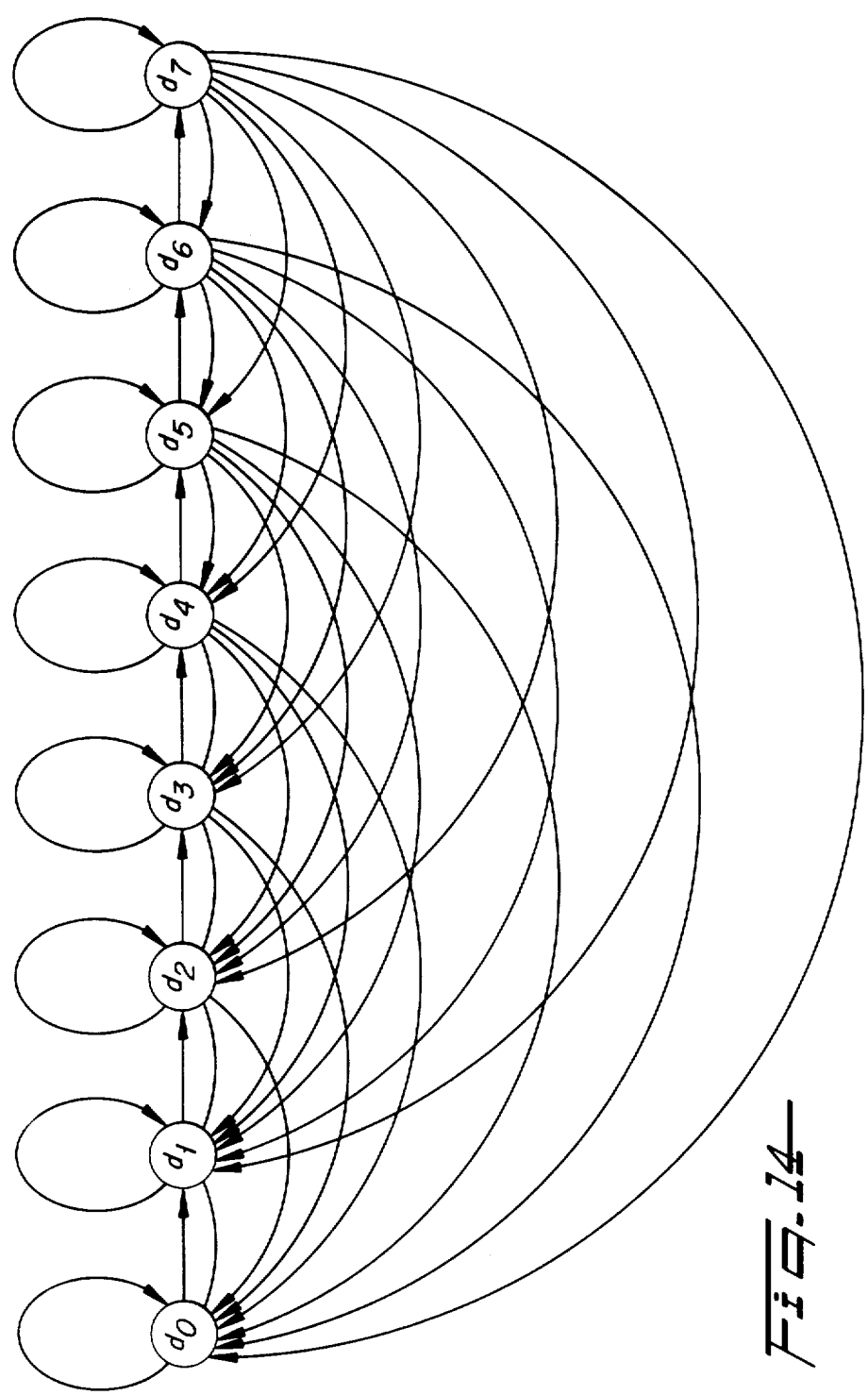
FIG. 14 is a state diagram of the one byte delay buffer transitions.

All the transition probabilities for the Markov process described by the buffer delay transitions shown in FIG. 14 can be generated with the delay transition matrix A in FIG. 15. This is a Markov process because the transition times were chosen as the time of the occurrence of an insertion.

Choosing an initial uniform delay distribution $$Pr\{d_k\} = \tfrac{1}{8}$$

for k=0, 1, 2, 3, 4, 5, 6, 7, where $d_k$ is the $k^{th}$ delay position of delay buffer 840, one can compute $$c_n = c_{n-1} A$$

where $c_0$ is the initial uniform distribution. The results of calculating the distribution for the delay buffer 840 position at the time of an insertion bit indicate that most of the time the encoder's delay buffer 840 is at the minimum delay position.

Performance of Bit Density Controllers with Channel Errors

The state machines of the encoder and decoder will transition to different states when a channel error occurs but will easily resynchronize whenever two 1-bits occur together in the data bit sequence. Sometimes only a single 1-bit can force resynchronization. If the advance buffer 850 and delay buffer 840 of the decoder and encoder are at different delay positions then they also will resynchronize. In particular, assume that the encoder delay buffer 840 is at a zero delay while the decoder's advance buffer 850 is at the one advance position. If a gap occurs then the delay buffer 840 will insert a 1-bit into the gap position and remain at the zero delay position. The occurrence of the same gap time at the decoder's advance buffer 850 will cause a forward shift of the data bit sequence and the advance will be set to the zero position which then corresponds to the delay in the encoder's delay buffer 840. Thus the occurrence of gaps will force the delay buffer 840 and advance buffer 850 to synchronize their delay and advance positions. If the buffers are at higher delay and advance positions then it will take more gaps to force resynchronization.

The state machines 800 for the encoder 805 and decoder 855 and delay buffer 840 and advance buffer 850 can be out of synchronization due to channel errors. In both cases automatic resynchronization takes place but until resynchronization occurs there can be a burst of errors. The following analyzes the frequency of error bursts and burst lengths due to channel errors.

Figure 16:
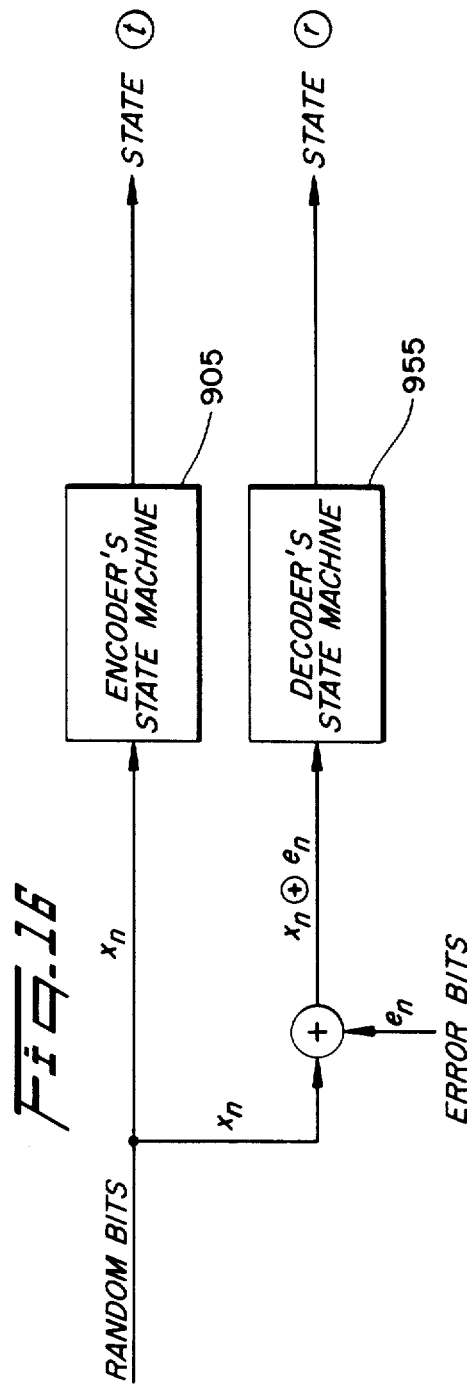
FIG. 16 is a block diagrammatic view of the bit density controller encoder and bit density controller decoder for calculating the impact of channel errors.

The state machines 800 of the encoder 805 and decoder 855 can be at different states whenever channel errors occur. FIG. 16 shows the model used herein for examining the probability distribution for the pair of states of the state machines 905 and 955 for the encoder 805 and decoder 855. Assume that the channel errors are independent random variables with bit error probability $\epsilon$. Define a super state as $$S = (t, r)$$

where $t$ is the state of the encoder's state machine 905 and $r$ is the state of the decoder's state machine 955. Since each state machine has one out of 16 possible states there are $16 \times 16 = 256$ possible super states. With this distribution of the super state it is straight forward to find the super state machine transition probabilities which depend on the channel bit error probability. Starting with the uniform distribution for the 256 super states, the steady state probability distribution can be calculated for the super states.

The only time a channel error can cause a burst of errors on the decoder 855 is when state 15 occurs in either the encoder's or the decoder's state machine 800 and the other state machine 800 is in a different state. Thus, a burst of errors occur at any time with probability given by $$Pr\{\text{burst}\} = \sum_{k=0}^{14} Pr\{(k,15)\} + \sum_{k=0}^{14} Pr\{(15,k)\}$$

which is the sum of the steady state probabilities for super states where one state machine 800 is in state 15 and the other is in some other state. For channel bit error probability ε the probability of beginning a burst at a given time is in general found to be $$Pr\{\text{burst}\} = 5.120 \times 10^{-4} \times \epsilon$$
$$= \epsilon/1953.$$

Computations of the steady state super state show that for every 1953 channel bit errors there will be a burst of errors due to the encoder 805 and decoder 855 being out of synchronization due to channel errors.

The burst length is determined by the delay positions of the delay buffer 840 and advance buffer 850. For gaps occurring once every frame the average burst length is Average length = 99 bits while for gaps occurring once every two frames, the average burst length is Average length = 198 bits.

These average burst lengths are computed by first computing the average time delay for delay buffer 840 and advance position for the advance buffer 850 and then multiplying by the probability of these positions and summing over all possible positions.

In the first case the overall bit error probability is increased by 2.5% while in the second case the increase is 5%. Channel errors generally tend to occur in bursts so that these results show that some small fraction of these channel error bursts get extended by an average of 99 bits if gaps are used once per frame or by 198 bits if gaps are used once every two frames. The effects of this are negligible.

It will be apparent to those skilled in the art that various modifications can be made to the bit density controller of the instant invention without departing from the scope or spirit of the invention, and it is intended that the present invention cover modifications and variations of the bit density controller provided they come within the scope of the appended claims and their equivalents.

We claim:

1. A bit density controller encoder for continuously operating on a data bit sequence and having a data input and a data output, comprising:

state means having a state index and states zero through n−1, and coupled to the data input, for sensing the data bit sequence and incrementing said state index to a next higher state in response to sensing a 0-bit, returning said state index to the zero state in response to sensing a 1-bit with said state index at any of the states zero through (n/2)−1, decrementing said state index by (n/2)−1 states in response to sensing a 1-bit with said state index at any of the states n/2 through n−1, and generating an output signal in response to incrementing said state index past the n−1 state;

substitution means coupled to the data input and said state means, and responsive to the output signal, for changing the 0-bit following the n−1 state to a 1-bit;

buffer means coupled to said substitution means for storing at least one frame of said data bit sequence;

memory means coupled to said state means and responsive to the output signal, for generating and storing overhead bits; and means coupled to said memory means, said buffer means, and said data output, for inserting said overhead bits into said data bit sequence and outputting said data bit sequence to said data output.

2. A bit density controller encoder for continuously operating on a data bit sequence and having a data input and a data output, comprising:

state means coupled to the data input and having a state index and states zero through n−1, and responsive to sensing a 0-bit for incrementing said state index to a next higher state, and responsive to incrementing said state index to the n−1 state and generating an output signal; and substitution means coupled to the data input, the data output, said state means, and responsive to the output signal for changing the 0-bit following the n−1 state in the data bit sequence to a 1-bit.

3. The bit density controller encoder as set forth in claim 2, further comprising:

buffer means coupled to said substitution means for storing at least one frame of said data sequence;

memory means coupled to said state means and responsive to the output signal, for generating and storing overhead bits; and means coupled to said memory means, said buffer means, and said data output, for inserting said overhead bits into said data bit sequence and outputting said data bit sequence to said data output.

4. The bit density controller encoder as set forth in claim 2, wherein said state means includes means for returning said state index to the zero state in response to sensing a 1-bit with said state index at any of the states zero through (n/2)−1.

5. The bit density controller encoder as set forth in claim 2, wherein said state means includes means for decrementing said state index by (n/2)−1 states in response to sensing a 1-bit with said state index at any of the states n/2 through n−1.

6. A bit density controller encoder for continuously operating on a data bit sequence and having a data input and a data output, comprising:

state means having a state index and states zero through n−1, and coupled to the data input, for sensing the data bit sequence and incrementing said state index to a next higher state in response to sensing a 0-bit, returning said state index to the zero state in response to sensing a 1-bit with said state index at any of the states zero through (n/2)−1, decrementing said state index by (n/2)−1 states in response to sensing a 1-bit with said state index at any of the states n/2 through n−1, and generating an output signal in response to incrementing said state index to the n−1 state; and substitution means coupled to the data input, the data output, said state means, and responsive to the output signal, for changing the 0-bit following the n−1 state in the data bit sequence to a 1-bit.

7. The bit density controller encoder as set forth in claim 1, 2 or 6, wherein the number of states, n, equals 16, thereby permitting operation of said bit density controller on an AT&T T1 network.

8. A bit density controller encoder for performing in a channel service unit system for a data bit sequence, comprising:
- a state machine having a state index and states zero through n−1, and coupled to a data input, for tracking 0-bits in the data bit sequence and for generating an output signal in response to the data bit sequence resulting in the state machine reaching the n−1 state; and
- means coupled to said state machine and responsive to the output signal for substituting a 1-bit in the data sequence.

9. A bit density controller encoder for continuously operating on a data bit sequence and having a data input and a data output, comprising:
- state means having a state index and states zero through n−1, and coupled to the data input, for sensing the data bit sequence and incrementing said state index to a next higher state in response to sensing a 0-bit, returning said state index to the zero state in response to sensing a 1-bit with said state index at any of the states zero through (n/2)−1, decrementing said state index by (n/2)−1 states in response to sensing a 1-bit with said state index at any of the states n/2 through n−1, and generating an output signal in response to n 0-bits incrementing said state index past the n−1 state;
- substitution means coupled to the data input and said state means, and responsive to the output signal, for changing the 0-bit following the n−1 state in the data bit sequence to a 1-bit;
- buffer means coupled to said substitution means for storing at least one frame of said data sequence;
- memory means coupled to said state means and responsive to the output signal, for generating and storing overhead bits; and
- means coupled to said memory means, said buffer means, and said data output, for inserting said overhead bits into said data bit sequence and outputting said data bit sequence to said data output.

10. The bit density controller encoder as set forth in claim 8, wherein said state machine includes means for returning said state index to the zero state in response to sensing a 1-bit with said state index at any of the states zero through (n/2)−1.

11. The bit density controller encoder as set forth in claim 8, wherein said state means includes means for decrementing said state index by (n/2)−1 states in response to sensing a 1-bit with said state index at any of the states n/2 through n−1.

12. The bit density controller encoder as set forth in claim 1, 2, 6 or 9, wherein said state means further includes means responsive to sensing a preselected data bit within a frame, for transitioning said state index to state n−1 if said state index is at a preset state.

13. The bit density controller encoder as set forth in claim 1, 2, 6 or 9, further having said state means responsive to sensing two data bits in sequence before a frame data bit for jumping said stae index from state n−3 to state n−1.

14. An enhanced bit density controller encoder for continuously operating on a data bit sequence and having a data input and a data output, comprising:
- scrambling means coupled to said data input and responsive to the data bit sequence for generating a random data bit sequence;
- a bit density controller encoder coupled to an output of said scrambling means and to said data output, said bit density controller encoder including,
- state means having a state index and states zero through n−1, and coupled to the data input, for sensing the data bit sequence and incrementing said state index to a next higher state in response to sensing a 0-bit, returning said state index to the zero state in response to sensing a 1-bit with said state index at any of the through (n/2)−1, decrementing said state index by (n/2)−1 states in response to sensing a 1-bit with said state index at any of the states n/2 through n−1, and generating an output signal in response to any bit following said state index at the n−1 state;
- substitution means coupled to the data input, said state means, and responsive to the output signal, for changing the 0-bit following state (n−1) in the data bit sequence to a 1-bit;
- buffer means coupled to said substitution means for storing at least one frame of said data sequence;
- memory means coupled to said state means and responsive to the output signal, for generating and storing overhead bits; and
- means coupled to said memory means, said buffer means, and said data output, for inserting said overhead bits into said data sequence and outputting said data sequence to said data output.

15. The enhanced bit density controller encoder as set forth in claim 14, wherein said scrambling means includes a scrambling device for transforming the data sequence into a purely random sequence.

16. The enhanced bit density controller encoder as set forth in claim 14, wherein said scrambling means includes an encryption device for transforming the data sequence into a purely random sequence.

17. A bit density controller decoder for continuously operating on a data bit sequence and having a received data input and a corrected data output, comprising:
- state means having a state index and states zero through n−1, and coupled to the received data input, for sensing the data bit sequence and incrementing said state index to a next higher state in response to sensing a 0-bit, returning said state index to the zero state in response to sensing a 1-bit with said state index at any of the states zero through (n/2)−1, decrementing said state index by (n/2)−1 states in response to sensing a 1-bit with said state index at any of the states n/2 through n−1, and generating an output signal in response to incrementing said state index past the n−1 state;
- overhead bit means coupled to the received data input for reading and storing overhead bits;
- buffer means coupled to the received data input for storing at least one frame of said data bit sequence; and
- means coupled to the corrected data output, said buffer means, said overhead bit means, and said state means and responsive to the output signal, for correcting subtsituted 1-bits.

18. A bit density oontroller decoder for continuously operating on a data bit sequence and having a received data input and a corrected data output, comprising:
- state means coupled to the received data input and having a state index and states zero through n−1, and responsive to sensing a 0-bit for incrementing said state index to a next higher state, and responsive to incrementing said state index to the n−1 state and generating an output signal; and means coupled to the corrected data output, and said state means and responsive to the output signal, for correcting subtsituted 1-bits following the n−1 state in the data bit sequence.

19. The bit density controller decoder as set forth in claim 18, further comprising:

overhead bit means coupled to the received data input for reading and storing overhead bits; and buffer means coupled to the received data input for storing at least one frame of said data bit sequence.

20. The bit density controller decoder as set forth in claim 18, wherein said state means includes means for returning said state index to the zero state in response to sensing a 1-bit with said state index at any of the states zero through (n/2)−1.

21. The bit density controller deooder as set forth in claim 18, wherein said state means includes means for decrementing said state index by (n/2)−1 states in response to sensing a 1-bit with said state index at any of the states n/2 through n−1.

22. A bit density controller decoder for continuously operating on a data bit sequence and having a received data input and a corrected data output, comprising:

state means having a state index and states zero through n−1, and coupled to the received data input, for sensing the data bit sequence and incrementing said state index to a next higher state in response to sensing a 0-bit, returning said state index to the zero state in response to sensing a 1-bit with said state index at any of the states zero through (n/2)−1, decrementing said state index by (n/2)−1 states in response to sensing a 1-bit with said state index at any of the states n/2 through n−1, and generating an output signal in response to incrementing said state index to the n−1 state; and means coupled to the corrected data output, and said state means and responsive to the output signal, for correcting subtsituted 1-bits following the n−1 state in the data bit sequence.

23. The bit density controller decoder as set forth in claim 17, 18 or 22, wherein the number of states, n, equals 16, thereby permitting operation of said bit density controller decoder on an AT&T T1 network.

24. A bit density controller decoder for performing in a channel service unit system for a data bit sequence, comprising:

a state machine having a state index and states zero through n−1, and coupled to the received data input, for tracking 0-bits in the data bit sequence and for generating an output signal in response to the data bit sequence resulting in the state machine reaching the n−1 state; and means coupled to said state machine and responsive to the output signal for correcting a substituted 1-bit in the data bit sequence.

25. A bit density controller decoder for continuously operating on a data bit sequence and having a received data input and a corrected data output, comprising:

state means having a state index and states zero through n−1, and coupled to the received data input, for sensing the data bit sequence and incrementing said state index to a next higher state in response to sensing a 0-bit, returning said state index to the zero state in response to sensing a 1-bit with said state index at any of the states zero through (n/2)−1, decrementing said state index by (n/2)−1 states in response to sensing a 1-bit with said state index at any of the states n/2 through n−1, and generating an output signal in response to n 0-bits incrementing said state index past the n−1 state;

overhead bit means coupled to the received data input for reading and storing overhead bits;

buffer means coupled to the received data input for storing at least one frame of said data bit sequence; and means coupled to the corrected data output, said buffer means, said overhead bit means, and said state means and responsive to the output signal, for correcting subtsituted 1-bits following the n−1 state in the data bit sequence to a 1-bit.

26. The bit density controller decoder as set forth in claim 24, wherein said state machine includes means for returning said state index to the zero state in response to sensing a 1-bit with said state index at any of the states zero through (n/2)−1.

27. The bit density controller decoder as set forth in claim 24, wherein said state machine includes means for decrementing said state index by (n/2)−1 states in response to sensing a 1-bit with said state index at any of the states n/2 through n−1.

28. The bit density controller decoder as set forth in claim 17, 18, 22, or 25, wherein said state means further includes means responsive to sensing a preselected data bit within a frame, for transitioning said state index to state n−1 if said state index is at a preset state.

29. The bit density controller decoder as set forth in claim 17, 18, 22, or 25, further having said state means responsive to sensing two data its in sequence before the frame data bit for jumping said state index from state n−3 to state n−1.

30. An enhanced bit density controller decoder for continuously operating on a random data bit sequence and having a received data input and a corrected data output, comprising:

descrambling means coupled to said corrected data output and responsive to the random data bit sequence for generating a data bit sequence;

a bit density controller decoder coupled to the received data output and to said descrambling means, said bit density controller decoder including, state means having a state index and states zero through n−1, and coupled to the received data input, for sensing the data bit sequence and incrementing said state index to a next higher state in response to sensing a 0-bit, returning said state index to the zero state in response to sensing a 1-bit with said state index at any of the states zero through (n/2)−1, decrementing said state index by (n/2)−1 states in response to sensing a 1-bit with said state index at any of the states n/2 through n−1, and generating an output signal in response to any bit following said state index at the n−1 state;

overhead bit means coupled to the received data input for reading and storing overhead bits;

buffer means coupled to the received data input for storing at least one frame of said data bit sequence; and means coupled to the descrambling means, said buffer means, said overhead bit means, and said state means and responsive to the output signal, for correcting subtsituted 1-bits.

31. The enhanced bit density controller decoder as set forth in claim 30, wherein said descrambling means includes a descrambling device for transforming a purely random sequence into the data bit sequence.

32. The enhanced bit density controller decoder as set forth in claim 30, wherein said descrambling means includes a deencryption device for transforming a purely random sequence into the data bit sequence.

33. A method for continuously monitoring a data bit sequence using a state machine having a state index and states zero through $n-1$ for ensuring there exists at least one 1-bit per every n-bits, comprising the steps, performed by the state machine, of:

sensing a data bit from the data bit sequence and determining if the sensed data bit is a 0-bit;

determining if the state index is at state $n-1$ in response to the sensed data bit being a zero bit;

incrementing said state index in response to the sensed data bit being a zero bit and said state index not being at state $n-1$;

changing the sensed data bit to a 1-bit in response to the sensed data bit being a zero bit and said state index being at state $n-1$.

34. The method for continuously monitoring a data bit sequence as set forth in claim 33, further comprising the steps of:

determining if the state index is at any of the states zero through $(n/2)-1$, in response to the sensed data bit being a 1-bit;

decrementing the state index by $(n/2)-1$ in response to the sensed data bit being a 1-bit and the state index being at any of the states $n/2$ through $n-1$;

resetting the state index to state zero in response to the sensed data bit being a 1-bit and the state index being at any of the states zero through $(n/2)-1$.

35. The method for continuously monitoring a data bit sequence as set forth in claim 33, further comprising the steps of:

determining if the state index is between states zero and $(n/2)-1$, in response to the sensed data bit being a 0-bit;

decrementing the state index by $(n/2)-1$ in response to the sensed data bit being a 0-bit and the state index being at state $n-1$, or in response to the sensed data bit being a 1-bit and the state index being at any of the states $n/2$ through $n-1$; and resetting the state index to state zero in response to the sensed data bit being a 1-bit and the state index being at any of states zero and $(n/2)-1$.

36. A method for continuously monitoring a data bit sequence using a state machine having a state index and states zero through $n-1$ for ensuring there exists at least one 1-bit per every n-bits, comprising the steps, performed by the state machine, of:

sensing a data bit from the data bit sequence and determining if the sensed data bit is a 0-bit;

determining if the state index is at state $n-1$ in response to the sensed data bit being a zero bit;

incrementing said state index in response to the sensed data bit being a zero bit and said state index not being at state $n-1$;

reading and storing overhead bits;

correcting the sensed data bit with a stored overhead bit in response to said state index being at state $n-1$.

37. The method for continuously monitoring a data bit sequence as set forth in claim 36, further comprising the steps of:

determining if the state index is at any of the states zero through $(n/2)-1$, in response to the sensed data bit being a 1-bit;

decrementing the state index by $(n/2)-1$ in response to the sensed data bit being a 1-bit and the state index being at any of the states $n/2$ through $n-1$;

resetting the state index to state zero in response to the sensed data bit being a 1-bit and the state index being at any of the states zero through $(n/2)-1$.

38. The method for continuously monitoring a data bit sequence as set forth in claim 36, further comprising the steps of:

determining if the state index is between states zero and $(n/2)-1$, in response to the sensed data bit being a 0-bit;

decrementing the state index by $(n/2)-1$ in response to the sensed data bit being a 0-bit and the state index being at state $n-1$, or in response to the sensed data bit being a 1-bit and the state index being at any of the states $n/2$ through $n-1$; and resetting the state index to state zero in response to the sensed data bit being a 1-bit and the state index being at any of states zero and $(n/2)-1$.

39. A bit density controller encoder for continuously operating on a data bit sequence and having a data input and a data output, comprising:

state means having a state index and states zero through $n-1$, and coupled to the data input, for sensing the data bit sequence and incrementing said state index to a next higher state in response to sensing a 0-bit, returning said state index to the zero state in response to sensing a 1-bit with said state index at any of the states zero through $(n/2)-1$, decrementing said state index by $(n/2)-1$ states in response to sensing a 1-bit with said state index at any of the states $n/2$ through $n-1$, and generating an output signal in response to incrementing said state index past the $n-1$ state;

controller means coupled to the data input and said state means, and responsive to the output signal, for inserting a 1-bit into the data bit sequence and for generating a delay bit sequence;

data buffer means coupled to said state means and between said data input and said controller means and responsive to the delay bit sequence, for delaying the data bit sequence, thereby allowing said controller means to insert a 1-bit into the data bit sequence; and gap means coupled to said controller means for generating a gap sequence for reducing a delay in the data bit sequence caused by said data buffer means.

40. A bit density controller encoder for continuously operating on a data bit sequence and having a data input and a data output, comprising:

state means having a state index and states zero through $n-1$, and coupled to the data input, for sensing the data bit sequence and incrementing said state index to a next higher state in response to sensing a 0-bit, returning said state index to the zero state in response to sensing a 1-bit with said state index at any of the states zero through $(n/2)-1$, decrementing said state index by $(n/2)-1$ states in response to sensing a 1-bit with said state index at any of the states $n/2$ through $n-1$, and generating an output signal in response to incrementing said state index past the $n-1$ state; and controller means coupled to the data input and said state means, and responsive to the output signal, for inserting a 1-bit into the data bit sequence.

41. The bit density controller encoder as set forth in claim 40, further comprising:

data buffer means coupled to said state means and between said data input and said controller means and responsive to the output signal, for delaying the data bit sequence, thereby allowing said controller means to insert a 1-bit into the data bit sequence.

42. The bit density controller encoder as set forth in claim 41, further comprising:

gap means coupled to said controller means for generating a gap sequence for reducing a delay in the data bit sequence caused by said data buffer means.

43. The bit density controller encoder as set forth in claim 39, 40 or 41, wherein said output signal is an insertion bit sequence having a 1-bit if an inserted 1-bit is required in the data bit sequence, and having a 0-bit if no inserted 1-bit is required in the data bit sequence.

44. A bit density controller decoder for continuously operating on a data bit sequence and having a data input and a data output, comprising:

state means having a state index and states zero through n−1, and coupled to the data input, for sensing the data bit sequence and incrementing said state index to a next higher state in response to sensing a 0-bit, returning said state index to the zero state in response to sensing a 1-bit with said state index at any of the states zero through (n/2)−1, decrementing said state index by (n/2)−1 states in response to sensing a 1-bit with said state index at any of the states n/2 through n−1, and generating an output signal in response to incrementing said state index past the n−1 state;

controller means coupled to the data input and said state means, and responsive to the output signal, for removing a 1-bit from the data bit sequence and for generating an advance bit sequence;

data buffer means coupled to said state means and between said data input and said controller means and responsive to the advance bit sequence, for advancing the data bit sequence, thereby allowing said controller means to remove a 1-bit from the data bit sequence; and gap means coupled to said controller means for generating a gap sequence for reducing an advance in the data bit sequence caused by said data buffer means.

45. A bit density controller decoder for continuously operating on a data bit sequence and having a data input and a data output, comprising:

state means having a state index and states zero through n−1, and coupled to the data input, for sensing the data bit sequence and incrementing said state index to a next higher state in response to sensing a 0-bit, returning said state index to the zero state in response to sensing a 1-bit with said state index at any of the states zero through (n/2)−1, decrementing said state index by (n/2)−1 states in response to sensing a 1-bit with said state index at any of the states n/2 through n−1, and generating an output signal in response to incrementing said state index past the n−1 state; and controller means coupled to the data input and said state means, and responsive to the output signal, for removing a 1-bit from the data bit sequence.

46. The bit density controller decoder as set forth in claim 45, further comprising:

data buffer means coupled to said state means and between said data input and said controller means and responsive to the output signal, for advancing the data bit sequence, thereby allowing said controller means to remove a 1-bit from the data bit sequence.

47. The bit density controller decoder as set forth in claim 46, further comprising:

gap means coupled to said controller means for generating a gap sequence for reducing an advance in the data bit sequence caused by said data buffer means.

48. The bit density controller decoder as set forth in claim 44, 45 or 46, wherein said output signal is an insertion bit sequence having a 1-bit if removal of a 1-bit is required in the data bit sequence, and having a 0-bit if no removal of a 1-bit is required in the data bit sequence.

49. A method for continuously monitoring a data bit sequence using a state machine having a state index and states zero through n−1 for ensuring there exists at least one 1-bit per every n-bits, comprising the steps, performed by the state machine, of:

sensing a data bit from the data bit sequence and determining if the sensed data bit is a 0-bit;

determining if the state index is at state n−1 in response to the sensed data bit being a zero bit;

incrementing said state index in response to the sensed data bit being a zero bit and said state index not being at state n−1;

inserting a 1-bit into the data bit sequence in response to the sensed data bit being a zero bit and said state index being at state n−1.

50. The method for continuously monitoring a data bit sequence as set forth in claim 49, further comprising the steps of:

determining if the state index is at any of the states zero through (n/2)−1, in response to the sensed data bit being a 1-bit;

decrementing the state index by (n/2)−1 in response to the sensed data bit being a 1-bit and the state index being at any of the states n/2 through n−1;

resetting the state index to state zero in response to the sensed data bit being a 1-bit and the state index being at any of the states zero through (n/2)−1.

51. The method for continuously monitoring a data bit sequence as set forth in claim 49, further comprising the steps of determining if the state index is between states zero and (n/2)−1, in response to the sensed data bit being a 0-bit;

decrementing the state index by (n/2)−1 in response to the sensed data bit being a 0-bit and the state index being at state n−1, or in response to the sensed data bit being a 1-bit and the state index being at any of the states n/2 through n−1;

resetting the state index to state zero in response to the sensed data bit being a 1-bit and the state index being at any of states zero through (n/2)−1; and inserting a 1-bit into the data sequence in response to the output signal.

* * * * *